(12) United States Patent
Bowman

(10) Patent No.: US 8,783,396 B2
(45) Date of Patent: Jul. 22, 2014

(54) HYDROCARBON FUELED-ELECTRIC SERIES HYBRID PROPULSION SYSTEMS

(75) Inventor: Jay J. Bowman, Florence, KY (US)

(73) Assignee: ePower Engine Systems, LLC, Florence, KY (US)

( * ) Notice: Subject to any disclaimer, the term of this patent is extended or adjusted under 35 U.S.C. 154(b) by 553 days.

(21) Appl. No.: 13/011,597

(22) Filed: Jan. 21, 2011

(65) Prior Publication Data

US 2011/0174561 A1 Jul. 21, 2011

Related U.S. Application Data

(60) Provisional application No. 61/297,094, filed on Jan. 21, 2010.

(51) Int. Cl.
*B60W 10/08* (2006.01)
(52) U.S. Cl.
USPC .................................. 180/65.285; 180/65.29
(58) Field of Classification Search
USPC ............... 180/65.29, 68.5; 429/437; 903/907
See application file for complete search history.

(56) References Cited

U.S. PATENT DOCUMENTS

| | | | |
|---|---|---|---|
| 4,081,693 A | 3/1978 | Stone | |
| 5,550,445 A | 8/1996 | Nii | |
| 5,589,743 A | 12/1996 | King | |
| 5,713,426 A | 2/1998 | Okamura | |
| 5,722,502 A | 3/1998 | Kubo | |
| 5,765,656 A * | 6/1998 | Weaver | 180/65.22 |
| 5,786,640 A | 7/1998 | Sakai et al. | |
| 5,828,201 A | 10/1998 | Hoffman, Jr. et al. | |
| 5,869,950 A | 2/1999 | Hoffman, Jr. et al. | |
| 5,910,722 A | 6/1999 | Lyons et al. | |
| 5,929,595 A * | 7/1999 | Lyons et al. | 320/104 |
| 5,939,794 A | 8/1999 | Sakai et al. | |
| 5,941,328 A * | 8/1999 | Lyons et al. | 180/65.1 |
| 5,969,624 A * | 10/1999 | Sakai et al. | 340/636.1 |
| 6,037,672 A | 3/2000 | Grewe | |
| 6,044,922 A | 4/2000 | Field | |
| 6,054,844 A | 4/2000 | Frank | |
| 6,055,466 A | 4/2000 | Grewe | |
| 6,116,368 A * | 9/2000 | Lyons et al. | 180/165 |
| 6,215,198 B1 * | 4/2001 | Inada et al. | 290/40 C |
| 6,230,496 B1 | 5/2001 | Hofmann et al. | |

(Continued)

FOREIGN PATENT DOCUMENTS

| | | |
|---|---|---|
| EP | 1876051 A1 | 1/2008 |
| EP | 2130734 A1 | 12/2009 |
| WO | 2009105448 A3 | 8/2009 |

*Primary Examiner* — Jeffrey J Restifo
(74) *Attorney, Agent, or Firm* — Alan G. Towner, Esq.; Pietragallo Gordon Alfano Bosick & Raspanti, LLP

(57) ABSTRACT

A hybrid propulsion system for powering vehicles such as class 8 DOT classified semi-tractor trucks under normal load conditions and at highway speeds comprises an internal combustion engine, an AC generator powered by the engine, DC battery packs, an AC/DC controller, and an AC electric motor driving the drive train of the vehicle. The AC generator and the DC battery packs provide input to the AC/DC controller, which, in turn, converts the DC input from the DC battery packs via a DC circuit to AC so that the output from the AC/DC controller to the electric motor is AC for powering the vehicle. The DC battery packs may comprise thin plate flooded lead acid cells and may be connected in series, in parallel or a combination thereof. Vehicles may be retrofitted to incorporate the propulsion system.

19 Claims, 11 Drawing Sheets

(56) References Cited

U.S. PATENT DOCUMENTS

| | | |
|---|---|---|
| 6,239,502 B1 | 5/2001 | Grewe et al. |
| 6,366,838 B1 | 4/2002 | Yoshino et al. |
| 6,377,880 B1 * | 4/2002 | Kato et al. .................. 701/32.9 |
| 6,397,965 B1 | 6/2002 | McFarlane et al. |
| 6,508,321 B1 | 1/2003 | Muller |
| 6,651,759 B1 | 11/2003 | Gruenwald et al. |
| 6,701,229 B2 | 3/2004 | Iwasaki |
| 6,719,076 B1 | 4/2004 | Tabata et al. |
| 6,817,432 B2 | 11/2004 | Kitada et al. |
| 6,836,027 B2 | 12/2004 | Lee |
| 6,876,098 B1 | 4/2005 | Gray, Jr. |
| 6,889,126 B2 | 5/2005 | Komiyama et al. |
| 6,943,460 B2 * | 9/2005 | Wakashiro et al. ......... 290/40 C |
| 7,034,482 B2 | 4/2006 | Komiyama et al. |
| 7,223,487 B2 * | 5/2007 | Morita ........................ 429/413 |
| 7,379,797 B2 | 5/2008 | Nasr et al. |
| 7,456,509 B2 | 11/2008 | Gray, Jr. |
| 7,520,352 B2 * | 4/2009 | Hoshiba et al. ............ 180/65.29 |
| 7,559,388 B2 | 7/2009 | Severinsky et al. |
| 7,682,717 B2 * | 3/2010 | Ueda et al. .................. 429/437 |
| 7,846,603 B2 * | 12/2010 | Druenert et al. ............. 429/437 |
| 8,417,403 B2 * | 4/2013 | Iida et al. ........................ 701/22 |
| 8,418,789 B2 * | 4/2013 | Nakamura et al. ........... 180/68.1 |
| 2001/0040061 A1 * | 11/2001 | Matuda et al. ............... 180/68.2 |
| 2004/0129465 A1 | 7/2004 | Yamaguchi |
| 2010/0087961 A1 | 4/2010 | Velez |
| 2010/0138092 A1 * | 6/2010 | Kohn ............................. 701/22 |
| 2010/0155162 A1 * | 6/2010 | Nakamura et al. ......... 180/65.29 |
| 2011/0206951 A1 * | 8/2011 | Ford et al. ....................... 429/50 |
| 2012/0046815 A1 * | 2/2012 | Hermann et al. ............... 701/22 |

* cited by examiner

HYDROCARBON FUELED-ELECTRIC SERIES HYBRID PROPULSION SYSTEMS

CROSS-REFERENCE TO RELATED APPLICATION

This application claims the benefit of U.S. Provisional Patent Application Ser. No. 61/297,094 filed Jan. 21, 2010, which is incorporated herein by reference.

FIELD OF THE INVENTION

The present invention relates to hydrocarbon fueled-electric series hybrid propulsion systems for powering vehicles, and more particularly relates to such propulsion systems for powering heavy vehicles such as class 8 DOT classified semi-tractor trucks under normal load conditions and at highway speeds.

BACKGROUND INFORMATION

A hybrid electric vehicle (HEV) is a vehicle that is powered by an electric motor and an internal combustion (IC) engine, including diesel or other hydrocarbon or fossil fueled engines. In a diesel-electric series hybrid propulsion system, the diesel engine is not directly linked to the transmission for mechanical drive power. Rather, the energy produced from the IC engine is converted to electric power by a generator, which re-charges a battery in order to provide power to one or more electric motors. The electric motor system provides torque to turn the wheels of the vehicle. Because the IC engine is not directly connected to the wheels, the IC engine can operate at an optimum rate and can be automatically or manually switched off for temporary all-electric, zero-emission operation of the vehicle. Conventional diesel-electric series hybrid propulsion systems are traditionally well-suited for lightweight commuting vehicles and stop-and-go transit buses.

Presently, there are no class 8 DOT over-the-road transportation vehicles such as semi-tractor trucks that use a diesel-electric series hybrid propulsion system as a power source at normal load (weight) conditions which are capable of maintaining highway speeds for an extended period of time. This is due, in part, to the power requirements of the transportation industry and, in part, to present day battery technology which does not meet the demands of class 8 DOT vehicles. Currently, the transportation industry relies on IC engine drive train systems as the propulsion systems for class 8 DOT vehicles in view of the reliability and cost advantage of operating such vehicles with IC engine drive train systems.

SUMMARY OF THE INVENTION

Conventional class 8 DOT vehicle IC engine drive trains are not very efficient in their use of fossil fuels for producing mechanical energy, e.g., efficiency is 38 percent or less. A conventional class 8 DOT vehicle averages 5.5 miles per gallon of diesel fuel under normal load conditions and at highway speeds.

In contrast, most electrical devices presently available have a relatively high efficiency range in their conversion of electrical power to mechanical power, e.g., from 92 to 97 percent. By removing the IC engine drive motor in a motor driven vehicle and using an external power source to supply power to an electric drive motor, greater fuel efficiencies may be obtained from a given fossil fuel. Operating the power source at an optimal power curve and rpm setting, while producing an electrical current to be used by the drive motor and controlling the current through a computer driven motor controller, may result in optimal efficiencies compared to typical IC engine drive trains.

There is therefore a need to provide a system that operates the power source at an optimal power curve and rpm setting, while producing an electrical current to be used by the drive motor and controlling this current through a computer driven motor controller in order to obtain optimal efficiencies compared to the typical IC engine drive train.

Present day designs of diesel-electric series hybrid vehicles generally use battery packs as a main power source to the drive motor. However, present day battery technology is typically the limiting design feature of diesel-electric series hybrid propulsion systems. In order to overcome these limitations, exotic battery materials are generally used in these electric propulsion systems. Examples of exotic battery materials include lithium cobalt oxide, lithium manganese, nickel cadmium and nickel-cobalt manganese. A battery pack that is designed with these exotic materials results in deep battery discharge cycles for the propulsion system. Battery packs designed with these exotic materials have been used as the main power source for an electric vehicle, or power is directed through the battery pack on its way to the electric drive motor. Using batteries in this way requires a deep discharge cycle capability of the individual battery cells to power the vehicle at normal speeds and ranges. This places large demands on the battery cells requiring more and more exotic materials in order to increase battery performance. These exotic materials, while providing some benefit to the electric propulsion system, are expensive and add to the complexity of the battery management system.

To date, conventional diesel-electric hybrid propulsion systems have been limited to speeds of about 35 mph operating on electric mode. Typically, the diesel engine remains connected to the drive system and powers the vehicle at speeds greater than 35 mph while the electric motor cuts out of the drive train at speeds greater than 35 mph and may only contribute a marginal amount of power when the vehicle is operated above 35 mph. This type of hybrid design places extra load on the drive train since the electric motor continues to be rotated even when it is not used to power the vehicle.

There is a need to provide hydrocarbon fueled-electric series hybrid propulsion systems for class 8 DOT vehicles such as over-the-road trucks that operate at greater efficiencies compared to conventional types of vehicles. The present invention may provide an IC engine powered vehicle that results in a 50 percent or even a 65 percent or greater decrease in fuel usage compared to conventional IC engine powered class 8 DOT vehicles.

Conventional class 8 DOT vehicles are generally powered by an IC engine with torque and speed controlled through the use of a manual or automatic transmission and the gear ratio of a drive train differential. Such conventional systems are generally complex and prone to wear and breakage due to the drive cycle demands of maintaining a given velocity while carrying loads of different configurations and weights. When a driver of a heavy haul vehicle is maneuvering in mountainous or hilly terrain, the constant need for changing the gears in the IC drive train system is a major source of driver fatigue.

There is therefore a need to provide hydrocarbon fueled-electric series hybrid propulsion systems which maintain a constant torque and speed to the differential which mimics an automatic transmission without the associated mechanical energy losses of such transmissions and the associated fluid power transfer losses, and without causing driver fatigue.

Conventional class 8 DOT vehicles conventionally use what is referred to as a "Jake brake" to slow the heavy vehicles without the use of an air brake system or to assist the air brake system in slowing the vehicle. This is a major safety feature and is standard in most heavy haul vehicles. The slowing or stopping of the vehicle is accomplished by using the back pressure of the IC engine. While performing this function well, the operation of the Jake brake is very loud. Many cities have banned or are in the process of banning vehicles using Jake brakes and have enacted noise ordinances thereby preventing the use of Jake brakes in vehicles.

There is therefore a further need to provide a hydrocarbon fueled-electric series hybrid propulsion system which eliminates the Jake brake and accomplishes the same slowing of a vehicle as the Jake brake but doing so electronically with very little or no noise.

The present invention has met the above-noted needs. A hydrocarbon fueled-electric series hybrid propulsion system is provided for powering vehicles, such as class 8 DOT trucks including semi-tractor trucks, under normal load conditions and at highway speeds greater than 35 mph. In an embodiment of the invention, the system comprises a hydrocarbon fueled internal combustion (IC) engine, an AC generator powered by the IC engine, one or more DC battery packs, an AC/DC controller, and an AC electric drive motor. In an embodiment of the invention, the AC generator driven by the IC engine provides an AC input to the AC/DC controller. The DC battery packs provide boost DC input to the AC/DC controller when required. The AC/DC controller converts the DC input from the DC battery packs via a DC circuit to AC so that the combined output from the AC/DC controller to the electric drive motor is AC. The AC electric drive motor may be mechanically connected directly to the wheel differentials without the use of a transmission for powering the wheels.

An embodiment of the present invention effectively uses an undersized AC generator to provide current to the AC electric drive motor. The DC battery packs retain about an 80 percent charge, allowing for electrical generation from the AC drive motor when braking or coasting. This supplies the DC batteries with controlled, regenerative power which, in turn, provides additional power to the AC/DC controller when required by the AC drive motor for acceleration and different load conditions.

In an embodiment of the invention, when the brakes are applied or in a coasting situation, the AC drive motor in conjunction with the AC/DC controller produces a DC current while providing regenerative braking. A portion of this power is used to keep the DC battery packs at an approximately 80 percent charge level, and the remainder or excess available DC current may be sent to various electrical systems such as a hydrogen generator, a hydraulic accumulator charging system, or other useful devices. In the case of a hydrogen generator, electrolysis of water is used to produce hydrogen gas that may then be injected into the hydrocarbon fueled engine to create additional power to the AC generator which, in turn, provides an AC current to the electric drive motor. The combining of hydrogen gas as a fuel admixture within the hydrocarbon fueled engine improves the mileage performance of the hydrocarbon fuel and reduces particulate emissions.

The electrical generation platform of the present invention provides ample DC current to produce usable amounts of hydrogen for injection into the hydrocarbon fuel injection system. When hydrogen is added to a fuel admixture in a constant rpm hydrocarbon fueled engine, fuel ignition timing issues are easily handled. This can result in as much as a 30 or 40 percent increase in fuel mileage with a cleaner burning engine and without the timing issues related to an IC engine operating at varying rpm modifications and torque ranges.

An aspect of the present invention is to provide a hybrid propulsion system for powering a vehicle comprising a hydrocarbon fueled engine, an AC generator powered by the hydrocarbon fueled engine, at least one DC battery, an AC/DC controller, and an AC electric motor drivingly connected to a power train of the vehicle, wherein the AC generator and the at least one DC battery provide input to the AC/DC controller, and the AC/DC controller converts DC input from the at least one DC battery to AC and outputs AC to the AC electric motor to drive the power train of the vehicle.

Another aspect of the present invention is to provide a class 8 DOT vehicle having a hybrid propulsion system comprising a hydrocarbon fueled engine, an AC generator powered by the hydrocarbon fueled engine, at least one DC battery, an AC/DC controller connected to the AC generator and the at least one DC battery, and an AC electric motor connected to the AC/DC controller and in driving engagement with a power train of the vehicle, wherein the class 8 DOT vehicle is capable of running at a speed of at least 50 mph for at least 5 hours.

A further aspect of the present invention is to provide a battery arrangement for a hybrid propulsion system for powering a vehicle under normal load conditions and at highway speeds, comprising at least one battery and means for controlling the temperature of the at least one battery.

Another aspect of the present invention is to provide a hybrid propulsion system for powering a vehicle comprising a power generation platform constructed and arranged to produce usable amounts of hydrogen gas for use as a fuel supplement by a hydrocarbon fueled engine in the hybrid propulsion system.

These and other aspects of the present invention will be more apparent from the following description.

DETAILED DESCRIPTION

Figure 1:
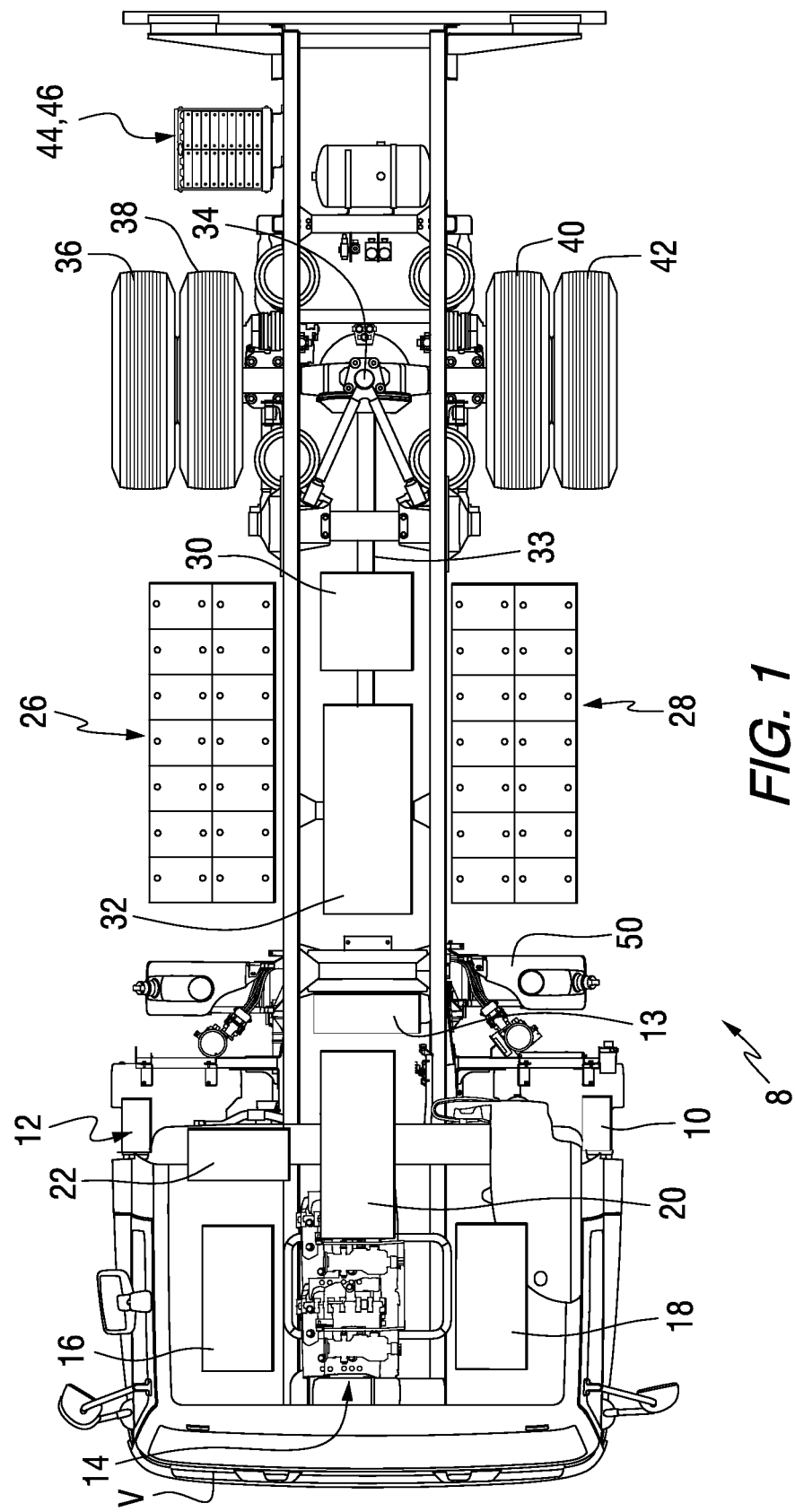
FIG. 1 is a partially schematic top view of a vehicle including a hydrocarbon fueled-electric series hybrid propulsion system in accordance with an embodiment of the present invention.
Figure 2:
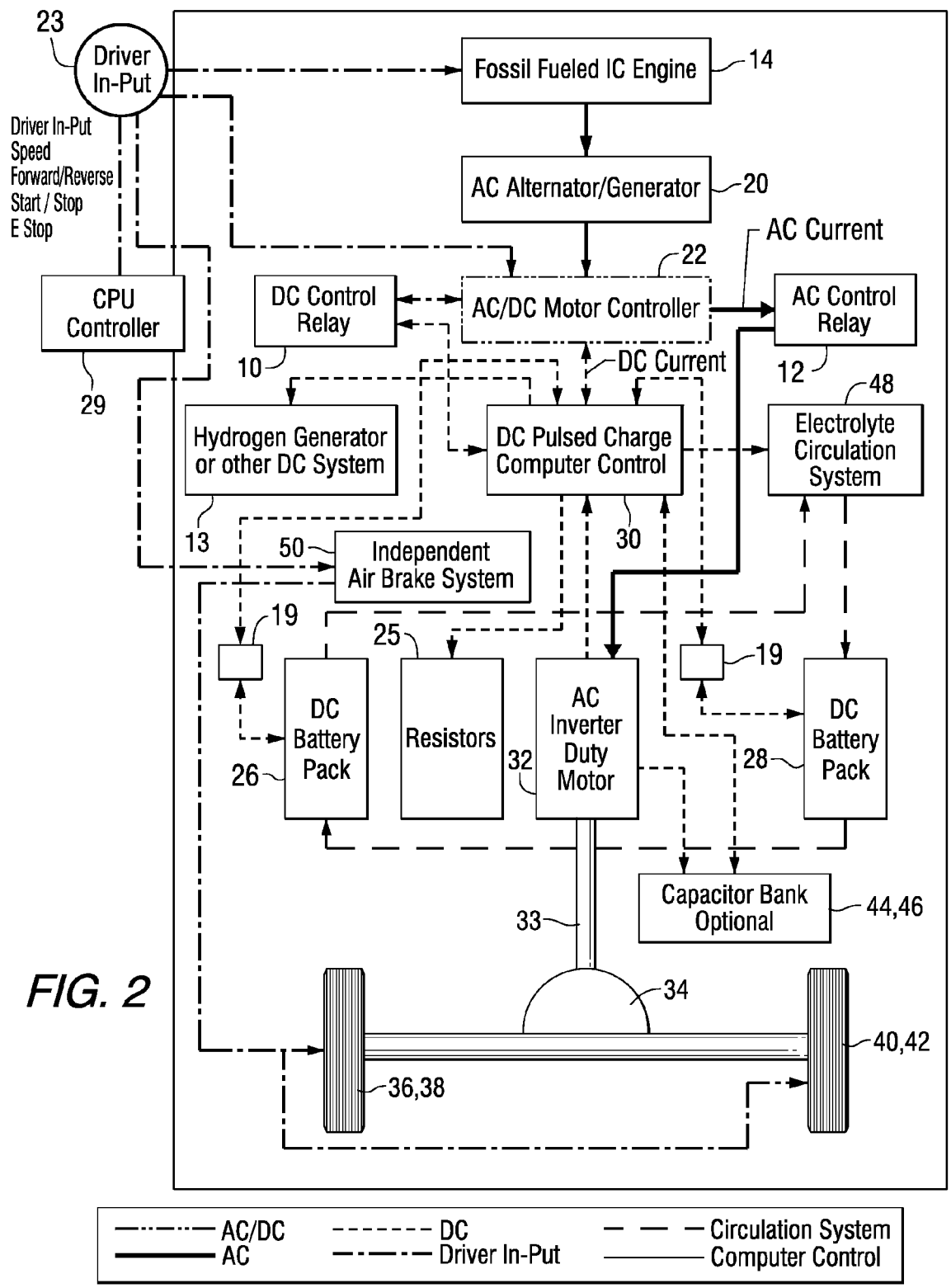
FIG. 2 is a flow chart illustrating a hydrocarbon fueled-electric series hybrid propulsion system and the various electrical connections of the several components of the system in accordance with an embodiment of the present invention.

FIG. 1 illustrates an arrangement of the components of a hydrocarbon fueled-electric series hybrid propulsion system 8 on a vehicle V in accordance with an embodiment of the present invention. FIG. 2 illustrates various components of the system 8 and their electrical connections. As shown in FIGS. 1 and 2, the hydrocarbon fueled-electric series hybrid propulsion system 8 comprises a hydrocarbon fueled engine 14, which is an internal combustion (IC) engine; hydrocarbon fuel tanks 16 and 18 for receiving hydrocarbon fuel which is delivered to engine 14; an AC generator 20 mechanically connected to the engine 14 via a shaft, which may be mechanically connected at the factory and sold as a unit referred to as a "gen-set"; an AC/DC controller 22 which is electrically connected to the AC generator 20 by high voltage wiring; a DC control relay 10; an AC control relay 12; an optional hydrogen generator 13; DC battery packs 26 and 28; a CPU controller interface 29 (FIG. 2) located in the cab of the vehicle V; a DC pulsed charge computer control 30 mounted at any suitable location on the vehicle V; an AC electric drive motor 32, which in some embodiments may be an inverter duty motor and which is mechanically connected via a shaft 33 directly to the rear differential 34 which, in turn, rotates wheels 36, 38, 40 and 42. Optionally, the system may make use of either an automatic or manual transmission (not shown) between the AC electric drive motor 32 and the differential 34. Optionally, the system may include capacitor banks 44 and 46, if required; an electrolyte circulation system 48; and/or an air brake system 50. The hydrocarbon fuel for the engine 14 may include diesel, gasoline, ethanol, propane, natural gas, hydrogen synthetic fuel, and the like.

As used herein, the term "class 8 DOT classified vehicle" means any vehicle having a gross vehicle weight rating (GVWR) greater than 33,000 pounds (14,969 kg) in accordance with the U.S. Department of Transportation (DOT) Gross Vehicle Weight Ratings or GVWR standard. As used herein, the term "AC generator" includes AC generators and alternators that convert mechanical energy into electricity by spinning wire coils in strong magnetic fields and inducing an electric potential in the coils.

The flow diagram of FIG. 2 illustrates the functions of the system 8. The double arrows of FIG. 2 show electrical power or current traveling in both directions. Each function may happen together or independently of each other depending on the electric drive motor requirements as in-put from the driver. As shown in FIG. 2, AC current flows from the AC generator 20 to the AC/DC motor controller 22. The AC current is then routed from the AC/DC motor controller 22 to the AC control relay 12 and then to the AC electric drive motor 32 for powering the vehicle V. The DC current from the AC/DC motor controller 22 goes to the DC pulsed charge computer controller 30 and then is routed to either the DC battery packs 26 and 28 for charging thereof, or to the optional hydrogen generator 13 or other DC systems, or to the capacitor banks 44 and 46, or back to the AC/DC motor controller 22, as directed by the CPU system controller 29 for the system 8. DC battery disconnects 19 may be used to interrupt current between the battery packs 26 and 28 and the DC pulsed charge computer controller 30. The CPU controller 29 may interface with the standard chipset of the vehicle, such as a J1939 chipset, which in turn interfaces with the existing vehicle systems.

The AC control relay 12 controls the AC power from the AC motor controller 22 to the AC inverter duty electric drive motor 32. The DC control relay 10 controls the DC output current from the AC motor controller 22 to the DC battery packs 26 and 28 and to the hydrogen generator 13 during the regenerative braking process. As shown in FIG. 2, the DC control relay 10 also controls the DC current input to the AC motor controller 22, which provides additional current to the AC/DC controller 22 for acceleration and climbing grades of the vehicle V. In some embodiments, the AC/DC controller 22 may be an industrial AC vector motor controller which is capable of both AC and DC power input that outputs a synchronized AC power to control the AC electric drive motor 32.

The AC electric drive motor 32, the AC/DC controller 22, and the AC generator 20 preferably are sized to obtain desired speed and load conditions taking into account the mass of the vehicle, the efficiency of the drive train, the coefficient of resistance of the rolling tires of the vehicle, the overall drag coefficient, the radius of the wheels, the resistance of the braking and steering, and the final gear ratio of the vehicle. Generally, this is a mathematical evaluation of the vehicle operating parameters, which may be done routinely by those skilled in the art in the design stage of the vehicle conversion process. This is done to obtain the most economical operation of the vehicle and to reduce vehicle emissions while allowing normal operation of the vehicle.

Efficiency of the drive train of FIG. 1 is obtained by operating the IC engine 14, powered by hydrocarbon fuel to which hydrogen gas may optionally be injected, to power the AC generator 20 at a constant fuel efficient rpm range as opposed to varying the rpm range according to conventional IC engine driven drive trains. In certain embodiments, the rpm range of the IC engine 14 may be varied, for example, when the vehicle comes to a temporary stop in traffic. In this case, fuel delivery to the engine 14 may be throttled back temporarily, e.g., 15 to 30 seconds, while the vehicle is stopped in order to reduce fuel consumption, and is then increased when the vehicle begins to move again. The battery packs 26 and 28 supply DC boost current supplementing the output produced by the AC generator 20, available to the AC electric drive motor 32, resulting in a more efficient drive train.

The propulsion system 8 of the present invention supplies boost power for accelerating the vehicle V by providing DC battery packs 26 and 28 which are configured and controlled to work with the AC/DC controller 22 via the DC pulsed charge computer control 30. When sizing the components of the propulsion system 8 to meet a desired speed and load configuration, additional current must be available to the AC/DC controller 22 to accelerate the vehicle V to a desired speed in a timely and normal fashion. In order to supplement this power requirement of the AC/DC controller 22, the DC battery packs 26 and 28, which may be computer controlled by the main computer CPU controller 29 (FIG. 2), are used as the boost system. The DC battery packs 26 and 28 may be wired in series, in parallel or in a combination, and may be capable of being switched from series to parallel configuration from pack to pack. The DC battery packs 26 and 28 may be used in conjunction with capacitor banks 44 and 46, if necessary. The capacitor banks 44 and 46 may be charged to the same voltage as the DC battery packs 26 and 28 in order to supply the required additional power to AC/DC controller 22, which, in turn, provides additional power to the AC electric drive motor 32 for powering the wheels 36, 38, 40 and 42 of the vehicle V.

In some embodiments, the AC/DC controller 22 may be operated in vector mode for controlling the inverter duty electric drive motor 32, which allows full motor design torque to be produced throughout a motor rpm range from 0 to base speed of the inverter duty electric motor 32. This eliminates the need for a transmission in some embodiments of the invention, thereby allowing direct coupling of the electric drive motor 32 to the rear differential 34 as shown in FIGS. 1 and 2. The AC/DC controller 22 electronically adjusts via a computer program in the CPU controller 29 the amount of torque and current that is available to the AC electric drive motor 32, thereby eliminating the need for a transmission and the mechanical losses associated with a transmission and the fluid power transfer losses to increase the efficiency of the drive train.

Figure 3:
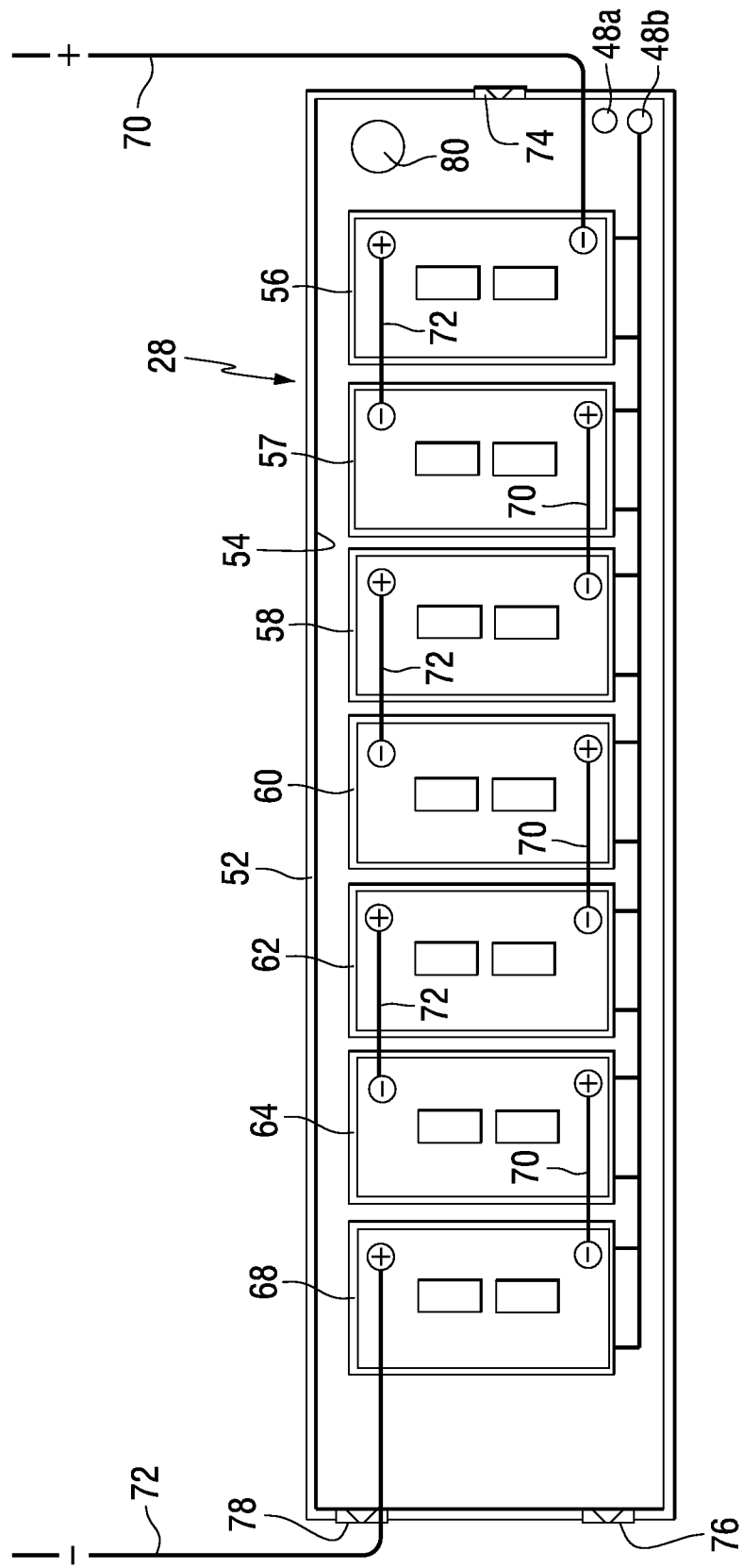
FIG. 3 is a partially schematic diagram of a battery pack used in the hydrocarbon fueled-electric series hybrid propulsion system in accordance with an embodiment of the present invention.

The DC battery packs 26 and 28 may comprise thin plate lead acid cells which are connected in series to obtain the required high voltage to meet the AC/DC controller 22 power requirements. FIG. 3 illustrates the construction of a DC battery pack 28. The DC battery pack 26 may be of similar construction. The DC battery pack 28 comprises a sealed rigid outer container or box 52 which may be made of aluminum. Within the container 52 is an acid resistant inner container or liner 54 which may be made of a suitable material, such as polypropylene. The battery pack 28 includes several battery cells 56, 57, 58, 60, 62, 64, 66 and 68, which are connected in series via power cables 70 and 72. Cable 70 is a positive connection and cable 72 is a negative connection. Each battery cell 56, 57, 58, 60, 62, 64, 66 and 68 is a thin plate flooded lead acid cell. In some embodiments, the thin plates of the lead acid cells may measure from about 0.5 to about 2 mm, for example, from about 1 to about 1.2 mm, as opposed to conventional thick plate flooded lead acid cells which generally measure from about 2.8 mm to about 6 mm. Several vents 74, 76 and 78 are provided along the sides of the outer container 52. The bottom of the outer container 52 preferably is filled with an acid absorbing material, e.g., vermiculite, and the top of the outer container 52 is filled with an impact absorbing material, for example, foam. An inlet 48a and an outlet 48b are provided for circulation of electrolyte from an electrolyte circulation system 48 (FIG. 2) within the battery pack 28. A forced air ventilation connection is indicated at reference numeral 80.

The system utilizes the DC battery packs 26 and 28 to take advantage of the low cost of flooded lead acid cell technology while providing fast discharging and charging rates. In accordance with an embodiment of the invention, the battery packs 26 and 28 may have their charge levels electronically controlled so as to be within about 20 percent of their target maintained state of charge. This provides rapid recharge rates of the cells while providing electrical storage capacity for the regenerative braking current. The integrated computer CPU controller 29 may provide a fast pulse charging system for the DC battery packs 26 and 28, thereby maintaining the maximum available DC current being drawn from the DC battery packs 26 and 28 during acceleration and hill climbing or high power requirements.

Figure 4:
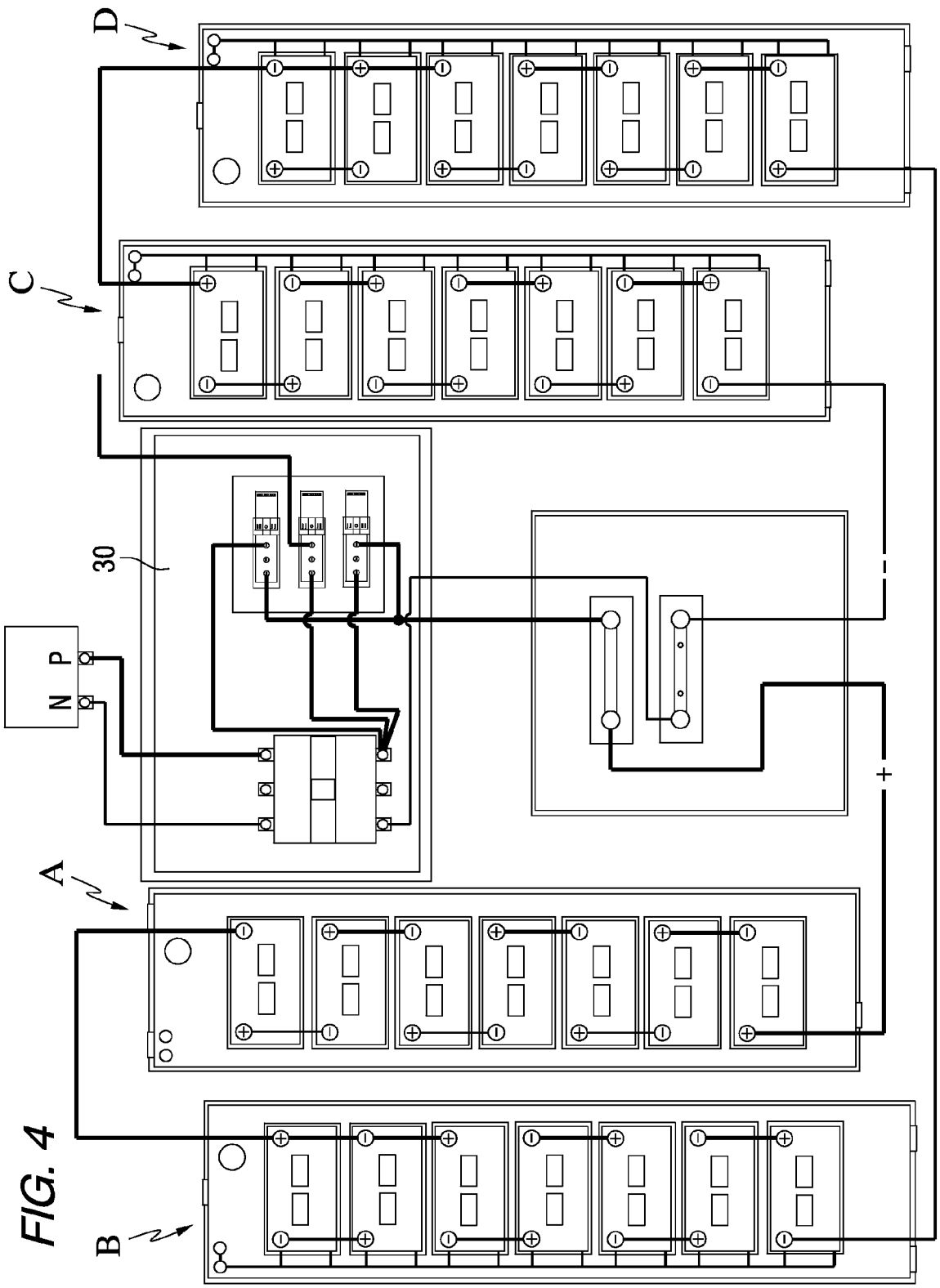
FIG. 4 is a diagram of a four battery pack arrangement containing batteries A, B, C and D, and a DC pulsed charge control system, used in a hydrocarbon fueled-electric series hybrid propulsion system in accordance with an embodiment of the present invention.

As shown in the embodiment of FIG. 4, multiple battery packs A, B, C, and D similar to battery packs 26 and 28 may be connected to a DC pulsed charge computer control 30 to act in series or in parallel depending upon the power requirements of the AC/DC controller 22 for controlling the AC inverter duty motor 32. This allows more efficient use of the electrical power that is available to the inverter duty electric drive motor 32. Via the main CPU system computer controller 29, the individual DC battery packs 26 and 28 are connected to the electrolyte pumping system 48 which heats and cools the electrolyte to maintain the optimum temperature range of the electrolyte circulating through the cells 56, 57, 58, 60, 62, 64, 66 and 68 of the battery packs 26, 28 (FIGS. 2 and 3). The electrolyte pumping system 48 may include a standard pump well-known to those skilled in the art.

Referring again to FIGS. 1 and 2, during the charging cycle of the thin plate flooded lead acid battery packs 26 and 28, the main factor for limiting the strength of the current being supplied to the battery is heat. In accordance with an embodiment of the present invention, computer control of the electrolyte temperature allows for the maximum current absorption of the battery cells 56, 57, 58, 60, 62, 64, 66 and 68 in the battery packs 26 and 28. By pulsing large charge current and cooling or heating the electrolyte in a battery cell to an optimal temperature, a larger amount of current can be supplied to the battery without generating excess heat within the cells 56, 57, 58, 60, 62, 64, 66 and 68. Therefore, the thin plate flooded lead acid cells and the integrated electrolyte circulation system 48 of the invention allow for faster charging of the DC battery packs 26 and 28 compared to that normally achieved. The electrolyte circulation system 48, as described herein, prevents stratification of the electrolyte within the individual cells 56, 57, 58, 60, 62, 64, 66 and 68 of the battery packs 26 and 28 and boiling off of the electrolyte during charging of battery packs 26 and 28, thereby allowing for faster recovery times of the battery packs 26 and 28 and longer life.

In accordance with an embodiment of the present invention, the temperature of the electrolyte within the batteries may be kept within a range of $\pm 25°$ C., typically within a range of $\pm 15°$ C. The optimal temperature for certain battery types typically ranges from about 20 to about 30 or 35° C. For example, under typical operating conditions, the optimal temperature of the battery electrolyte may be from about 24 to about 26° C. depending upon the particular battery type used, and the temperature may be kept within $\pm 2°$ C. or within $\pm 1°$ C. of the desired optimal temperature.

As shown in FIG. 2, the fast DC pulse charging system 30 for the battery packs 26 and 28 is supplied with DC current via the DC power control relay system 10 and controller via electrical signals from the CPU controller 29 in conjunction with the DC pulsed charge computer control 30. Additional charging current is available through the hydrocarbon fueled IC engine 14 powering the AC generator 20 when an optimal speed by the vehicle V is reached.

Regenerative braking can recapture much of the kinetic energy of the vehicle V and convert it into electricity so that it can be used to recharge the battery packs 26 and 28. In regenerative braking, the system that drives the vehicle does the majority of the braking. That is, when the driver steps on the brake pedal of the hybrid vehicle V, the brakes put the vehicle's electric motor 32 into a generation mode, thereby slowing the wheels 36, 38, 40 and 42 of the vehicle. When in the generation mode, the electrical field within the armature of the electric motor 32 is reversed thereby creating a generation field of current within the motor windings or negative torque. While in this generation mode, the electric motor 32 acts as an electric generator for producing electricity that is fed into the battery packs 26 and 28, or into the capacitor banks 44 and 46 and then into the battery packs 26 and 28, if capacitor banks 44 and 46 are used depending on the performance requirements of the vehicle V. In this manner, the battery packs 26 and 28 are maintained at about an 80 percent state of charge (SOC). Excess current is available for other systems.

The system 8 of the present invention operates as follows. At speeds less than about 35 mph, the inverter duty electric drive motor 32 is supplied with current from the hydrocarbon fueled IC engine 14 powering the AC generator 20. The AC current from the generator 20 is routed first to the AC/DC motor controller 22 which translates driver in-puts into torque speed controls and braking. Then power is routed to the AC control relay 12, which allows passage of the translated power requirements to the inverter duty electric drive motor 32. At speeds above about 35 mph, the IC powered generator 20 does not produce a sufficient amount of current to accelerate the vehicle above this speed at acceptable rates. This is sensed by the DC control relay 10 which then supplies supplemental boost power from the battery packs 26 and 28 as required to reach the desired driver in-putted velocity. A field weakening device, as described in more detail below, may be used at this stage to limit the power supplied by the IC engine 14 and AC generator 20. Once the DC control relay 10 senses that the current supplied by the AC generator 20 is sufficient to maintain the in-putted velocity, the DC control relay 10 cuts out the DC current supplied by the battery packs 26 and 28, thereby allowing the AC generator 20 to supply the required AC current to the AC control relay 12 and then to the AC electric drive motor 32 for continuous operation of the vehicle V through the drive shaft 33 and wheels 36, 38, 40 and 42.

With particular reference to FIG. 2, another function of the DC pulsed charge computer control 30 is to sense and allow any excess current not required to propel the vehicle at the desired velocity from the AC generator 20 to be routed back to the DC battery packs 26 and 28 for recharging. The AC current is routed from the AC generator 20 to the AC/DC motor controller 22, which sends a DC current to the DC pulsed charge computer control 30, which in turn, passes a DC pulsed charging current to the DC battery packs 26 and 28. During deceleration, coasting or braking of the vehicle, the electrical field of the AC inverter duty motor 32 is changed to provide current generation in the form of a DC current. This DC current is routed via DC control relay 10 to the AC/DC motor controller 22, and then to the pulsed DC charge computer control 30. The pulsed DC charge computer control 30 then determines the charge level in the battery packs 26 and 28 by way of a computer control program. If current is required by the battery packs 26 and 28, it is sent in a pulsed DC current to battery packs 26 and 28. When the batteries are at about 80 percent state of charge (SOC) or higher (state of charge referring to a fully charged battery), the excess current is routed to other on board devices. The pulsed DC charge computer control 30 then determines the state of charge. This programming maintains the DC battery packs 26 and 28 at about an 80 percent SOC and the cell electrolyte at an optimum temperature for fast charge and discharge operation of the DC battery packs 26 and 28. When the computer program determines an 80 percent SOC has been reached by the DC battery packs 26 and 28, any additional power is routed to the installed electrical-mechanical devices, such as the hydrogen generator 13 (FIGS. 1 and 2), a hydraulic accumulator charging system or other useful device. This allows for the use of additional power generated during the deceleration cycle to be turned into useful energy within the invention, including operation of an electric Jake Brake system. Surplus power may also be dissipated in the form of heat using braking resistors, as more fully described below.

In one embodiment, a zener diode regulation system may be used that activates when a target charge value (e.g., 80 percent) has been reached for each individual battery of the pack and blocks additional current or slows the current available to each battery within the pack. This allows current to flow to batteries within the pack that are at a lower SOC than the block activated batteries in the pack.

Still referring to FIG. 2, the air brake system 50 is an independent system and retains the design and function of a normally operated air braking system. When the brakes are applied or in a coasting situation, the AC electric drive motor 32 in conjunction with the AC/DC controller 22 produces a DC current. A portion of this power is used to keep the DC battery packs 26 and 28 at a target charge level. The excess available DC current is sent to various electrical systems depending upon the configuration of the vehicle V and its intended purpose, for example, the hydrogen generator 13 that uses the electrolysis of water to produce hydrogen gas. The produced hydrogen gas from hydrogen generator 13 may then be injected via an appropriate supply line into the hydrocarbon fueled engine 14 to provide additional power to the AC generator 20 which, in turn, provides an AC current to the electric drive motor 32. The combining of hydrogen gas as a fuel admixture within the hydrocarbon fueled engine 14 may generally improve the mileage performance of the hydrocarbon fuel, as well as reduce particulate emissions. The excess available DC current or power can also be used to power other systems in addition to the hydrogen generator 13. For example, the excess power can be used to power a hydraulic accumulator or similar devices.

Present day hydrogen injection systems generally use 12 volt DC for the electrolysis process. This only produces small amounts of hydrogen gas and does very little to enhance engine performance. The power or electrical generation platform of the system 8 of the invention provides ample DC current to produce usable amounts of hydrogen gas for injection into the hydrocarbon fueled engine 14. A further benefit of the electrical generation platform of the system 8 is a constant rpm speed of the hydrocarbon fueled engine 14 which is used to produce the AC current. Not having to operate the IC engine 14 at different rpm and power ranges reduces the complexity of the fuel injection timing control. This allows the economical operation of such a system while creating less emissions compared to a standard IC engine drive train. This can result in as much as a 30 or 40 percent or greater increase in fuel mileage with a cleaner burning engine and without the timing issues related to IC engines operating at varying rpm and torque ranges.

Referring again to FIGS. 1 and 2, the DC battery packs 26 and 28 are capable of fast recharge times through the use of the electrolyte circulation system 48, which is computer controlled by the CPU computer controller 29 to provide optimal discharge and charge conditions from the pulsed DC charge system 30 by heating and releasing the charge or cooling the electrolyte within the cells 56, 57, 58, 60, 62, 64 and 68 of the DC battery packs 26 and 28. The configuration of the several components of the hydrocarbon fueled electric propulsion system 8, and the computer control of these components which does not require a deep discharge of the battery cells 56, 57, 58, 60, 62, 64, 66 and 68, enhances the performance of the lead acid battery packs 26 and 28.

The AC power in system 8 is continuous throughout operation of the vehicle V, whereas the DC power generated in the system 8 turns on and off as required for acceleration and hill climbing to supplement the AC power of system 8. That is, the system 8 uses the DC battery packs 26 and 28 as a boost power system only during peak current demand of the vehicle V, and uses the AC generator 20, which is sized for a set speed and weight, as the primary energy source for the AC electric motor 32. These two factors result in an energy efficient, lower polluting drive train system of the vehicle V that retains the normal feel and drivability of a conventional vehicle.

Individual components of the hydrocarbon fueled electric propulsion system 8 of the invention may be off-the-shelf components that are commercially available. When these components are combined and used in conjunction with a CPU controller configuration in accordance with the present invention, they work in a synergistic manner to create a fuel efficient, low emission drive system. The hydrocarbon fueled electric propulsion system 8 retains normal road characteristics and is available at reasonable cost compared to conventional IC engine drive train systems used in class 8 DOT over the road vehicles, such as semi-tractor trucks.

The hydrocarbon fueled electric propulsion system 8 of the invention and its components are designed to be configurable for both new vehicle installations, as well as for conversion kits for existing IC engine vehicles. Designing the components of the hydrocarbon fueled electric propulsion system 8 into kit form can allow for the retrofitting of existing IC powered units at a viable price. In this embodiment, the kit may include a bolt on pre-wired system controller 29, an electrolyte circulation system 48 (FIG. 2), an on-board pulse charger 30 (FIG. 2) and the drive components 14, 20, 22, and 32 matched to a desired velocity and load weight.

Most electrical conversion of vehicles involves one-of-a-kind components designed so that they cannot be transferred from one vehicle to the next without extensive modifications to the IC vehicle. In some instances, the converted vehicles are essentially one-of-a-kind, which are difficult to diagnose and/or repair, and the conversion of these vehicles to an electric propulsion system is rather expensive. In accordance with the present invention, the hydrocarbon fueled electric propulsion system 8 may be installed onto a chassis of a truck classified up to a class 8 DOT via a bolted rack and box system. In doing so, the components of system 8 may be repaired by providing easy removal and outboard servicing of the components of system.

As stated above, in some embodiments, the engine 14 and AC generator 20 may be a "gen-set" wherein the components are mechanically connected at the factory and commercially sold as a matched unit. The hydrocarbon fueled IC engine 14 powers the AC generator 20, which operates at a constant power curve and rpm range. This is accomplished by sizing the engine 14 and AC generator 20 of the gen-set to the electrical load requirements of the vehicle design requirements. A gen-set normally operates at a constant rpm and torque range to supply the required electrical load. The only change of the rpm by the gen-set is at peak current demand. In the present invention, the DC battery packs 26 and 28 compensate for this peak demand allowing for a near constant rpm and torque operation of the gen-set of the vehicle. Engines that operate under constant conditions have a distinct advantage compared to engines that operate under varying power curves and rpm ranges and are more tolerant of ignition and fuel timing setting changes. Thus, the propulsion system 8 of the invention allows the hydrocarbon fueled engine 14 to have its ignition timing manipulated to a point that NO emissions may be reduced without affecting the performance of the engine 14 and the drive train of the system 8.

As described above, present day class 8 DOT vehicles are normally powered by an IC engine with torque and speed controlled through the use of a manual transmission and gear ratio of the drive train differential. This system tends to be complex and prone to wear and breakage due to the driver demands to maintain a given velocity while carrying varying weight loads. When the driver of a heavy haul vehicle is maneuvering in mountainous or hilly terrain, the constant need for changing gears in the IC drive train is a major source of fatigue. The present invention uses the AC vector motor controller 22 and computer programming of the CPU system controller 29 to maintain a constant torque and speed to the differential 34 coupled to the AC electric motor 32, which, in effect mimics an automatic transmission without the associated mechanical energy losses of such transmissions. The AC vector motor controller 22 may also be programmed to control negative as well as positive torque by using the generated electrical field within the inverter electric drive motor 32 via the on-board computer controller 29. This allows for computer controlled regenerative braking by using the AC motor 32 to produce an electrical current that is used to recharge a portion of the boost battery packs 26 and 28 and to create a braking force that is independent of the air brake system 50 via the on-board CPU system computer controller 29.

As also described above, a typical class 8 DOT vehicle uses what is referred to as a Jake brake which is used to slow heavy vehicles without the use of an air brake system or to assist the air brake system in slowing or stopping the vehicle. This is a major safety feature and is standard on most heavy haul vehicles. Braking is accomplished by using the back pressure of the IC engine. While performing this function well, the operation of the Jake brake is very loud. Many cities have banned or are in the process of banning vehicles that employ Jake brakes and have enacted noise ordinances thereby preventing the use of Jake brakes in some vehicles. The system 8 of the invention uses the AC/DC motor controller 22 in combination with the AC inverter duty motor 32 to accomplish the same slowing of a vehicle as the Jake brake system but does so electronically with very little or no noise. The AC/DC controller 22 is capable of finite control of the braking force by controlling the amount of regenerative power that is produced by the AC inverter drive motor 32 via the on-board computer controller 29. The AC/DC controller 22 of the invention when in a regenerative braking mode is vastly superior in accomplishing the same features of present day Jake brake systems in an IC drive train. Therefore, in some embodiments of the invention, the need for a Jake brake system may be eliminated.

Referring again to FIG. 1, the CPU system controller 29 translates operator interface of the vehicle to electrical signals for ignition, throttle, braking and torque to the AC motor controller 22. Another function of the CPU controller 29 is to allow for the transmission of data to an offsite center for the remote monitoring, diagnosing and manipulating of all electrical signals of the vehicle from a central location. This is useful for remote trouble shooting, vehicle repair and data acquisition of the drive components. Commercial data may also be sent to a central location by the CPU controller 29. This data can be useful in determining driver and vehicle performance, GPS location tracking, anti-theft and other useful information related to commerce. The information sent to and/or received by the CPU controller 29 is real time information.

FIG. 4 illustrates details of the battery packs A, B, C and D and a pulsed DC charge control system 30 for use in the propulsion system 8 of the invention. Pulsing of the DC charge current may allow for faster recharging of the batteries. In FIG. 4, each battery pack A through D comprises seven battery cells. Battery packs A, B, C and D may be similar to battery packs 26 and 28 of FIG. 3. The battery cells of each battery pack A through D are wired in series. The dark lines represent cables that are negative and the light lines represent cables that are positive. The switching and PC components are commercially available and can be assembled in the configuration of FIG. 4. The battery packs and the switching mechanism may be wired in series, in parallel, or in combinations thereof in order to change the configuration of the battery packs.

Figure 5:
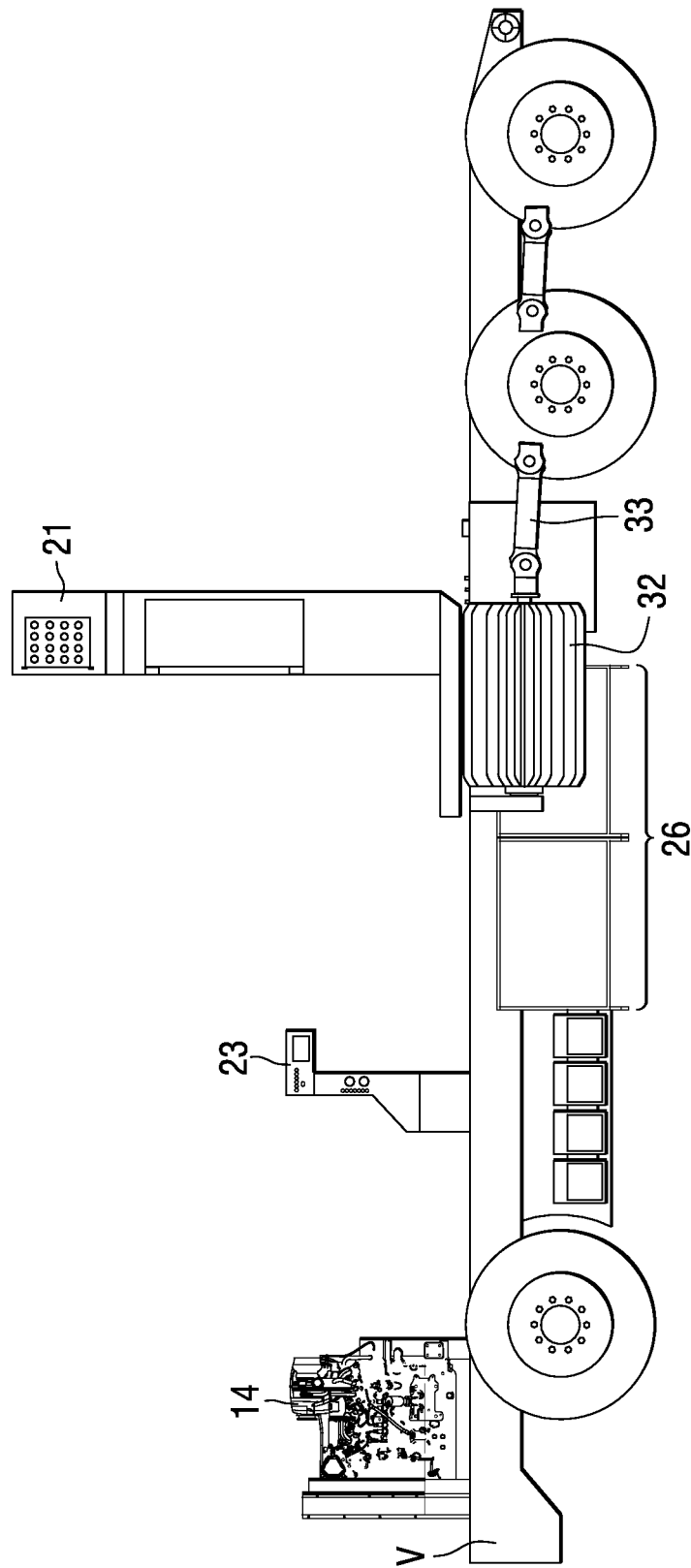
FIG. 5 is a partially schematic side view of a vehicle including a hydrocarbon fueled-electric series hybrid propulsion system in accordance with an embodiment of the present invention.

FIG. 5 is a partially schematic side view of a vehicle V including a hydrocarbon fueled-electric series hybrid propulsion system in accordance with an embodiment of the present invention, including the physical locations of the components of the system on the vehicle. Components in FIG. 5 that are similar to corresponding components in FIGS. 1-4 are labeled with the same element numbers. An electronics cabinet 21 is mounted behind the cab of the vehicle V, and a control panel 23 is mounted inside the cab.

To simplify the installation of the hybrid system as described, the cab-mounted main control panel 23 may be mounted over the removed original transmission housing in a converted vehicle. The main control panel 23 may contain the control and logic functions for operation of the hybrid drive system, as well as serving as the main connection point for the low voltage control wiring. The control panel 23 is situated as to not interfere with existing controls, allows for normal operator movement within the vehicle, and places necessary additional controls and monitoring devices within the operator's normal field of vision and reach. The main control panel 23 may contain the following operator interface monitoring and actuated controls: an amperage gauge to monitor current output of the battery packs 26 and 28; a volt meter to monitor battery pack voltage; a temperature gauge for battery pack monitoring; and a digital screen interface to monitor the IC engine and generator output. Operator override controls may be provided for the battery pack ventilation system, electrolyte cooling system 48, dynamic braking control, and ground fault or power leakage indicator lights with a start lock-out circuit. The main control panel 23 may also contain an individual battery monitoring gauge for testing or diagnostic use. In addition to providing operator feedback, such gauges and screens may provide relay interface control signals that are routed throughout the hybrid drive train components based on operator commands or signal feedback devices. The panel 23 may contain the logic boards and circuitry to activate the generator field current limiting circuit which interacts with the field weakening controller interface. This interface may be located within the main control panel 23 and allows for setting and monitoring of the device. Additional operator interface controls mounted within the main panel 23 may include a forward and reverse input device, on and off start command switch, E stop device for emergency power disconnection, and a reset button for system restart if a fault condition is present as well as other desired operator interface controls and signals.

Figure 7:
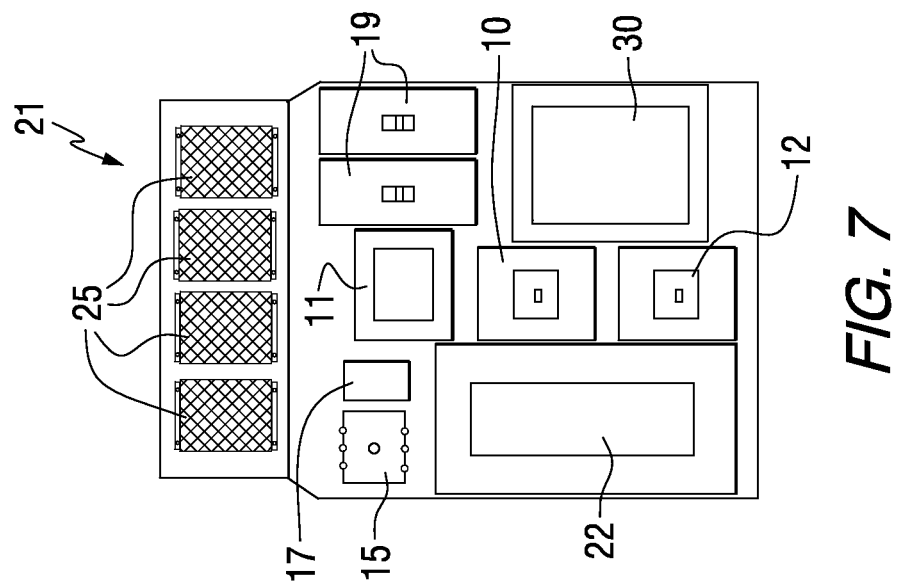
FIGS. 6 and 7 illustrate an electronics cabinet that houses certain components of a series hybrid propulsion system in accordance with an embodiment of the present invention.
Figure 6:
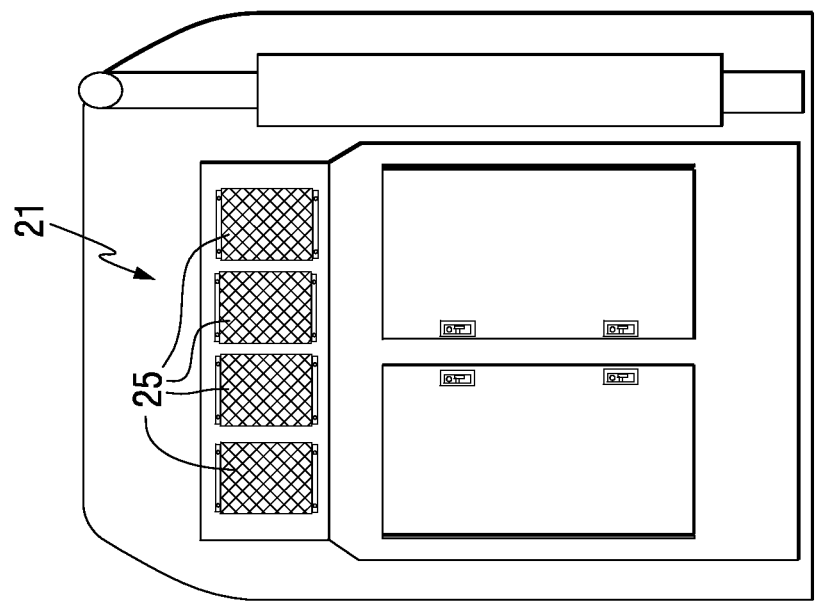

FIGS. 6 and 7 illustrate the electronics cabinet 21 mounted behind the cab of the vehicle that houses certain components of a series hybrid propulsion system in accordance with an embodiment of the present invention. The cabinet 21 houses the AC/DC controller 22, the pulsed charge computer control 30, the DC control relay 10, the AC control relay 12, and a controller 11 for the hydrogen generator that routes current from the computer control 30 to the hydrogen generator 13. In addition, the cabinet 21 may contain a series of braking resistors 25 which dissipate excess power in the form of heat when the system is in the braking mode. A main AC disconnect 15, GFI fault protector 17 and DC battery disconnects 19 are also housed in the cabinet 21.

Figure 8:
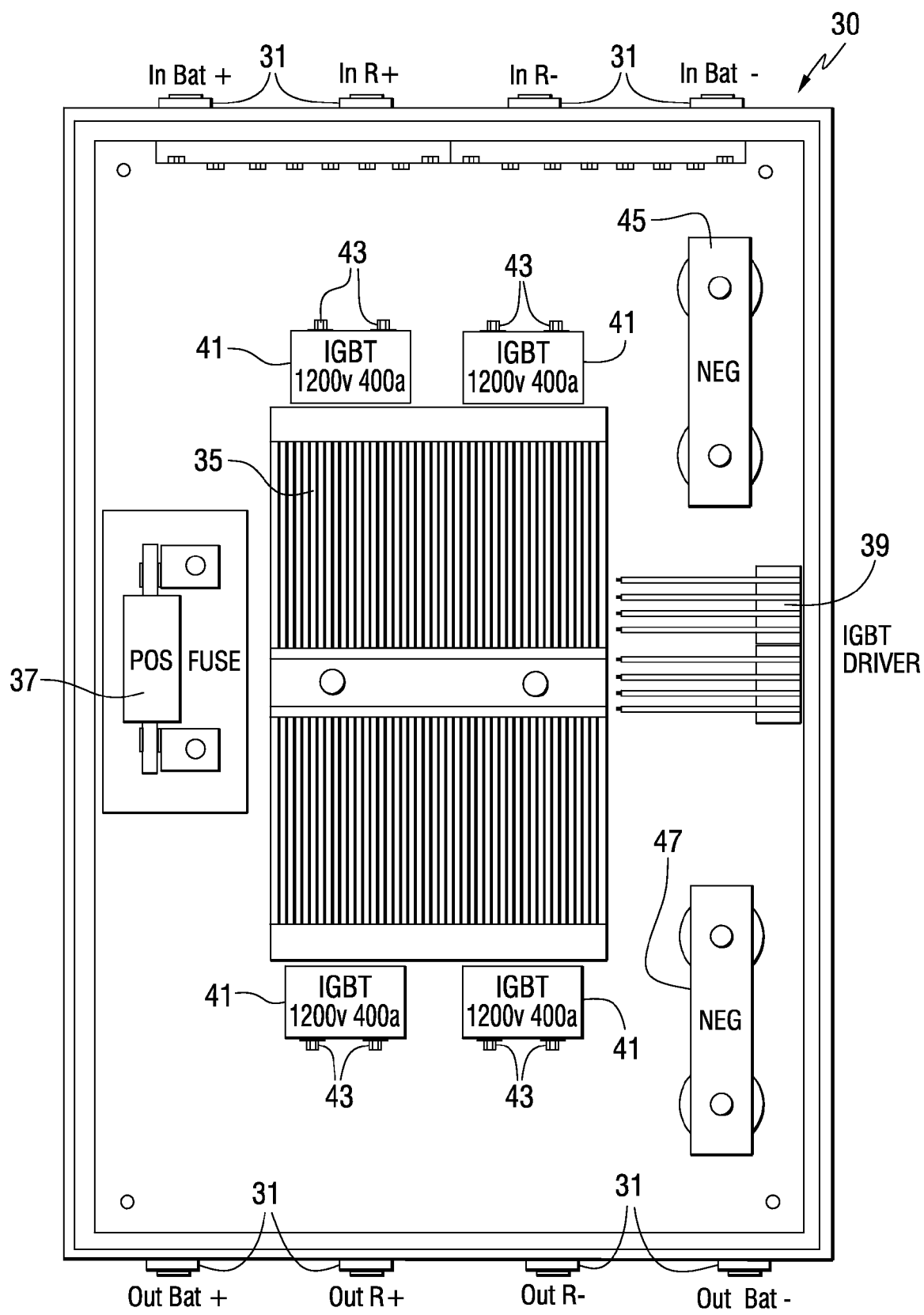
FIG. 8 illustrates a DC power control unit in accordance with an embodiment of the present invention.

FIG. 8 illustrates a DC power control unit 30 in accordance with an embodiment of the present invention. Available DC power is first routed to the DC power controller 30 from the battery packs 28 and 26 along with DC power generated during dynamic or regenerative braking via the AC/DC motor controller 22 produced by the AC motor 32. Power connection points 31 of the DC power controller 30 enable high voltage cabling to be held securely to the case. The positive leg of the DC power is routed to a main fuse block 37 to protect the battery packs from over current. The negative leg of the DC power is routed to the battery pack negative shunt connector 47, which sends a monitoring signal to the main control panel 23 located in the vehicle cab. Then the negative leg is routed to the battery pack negative power block 45 for further distribution. Positive and negative power cables within the DC power controller 30 are then routed to the insulated gate bipolar transistor (IGBT) switching units 41 that are mounted on or near an aluminum heat sink 35 that may be air cooled or liquid cooled for heat dissipation during switching operations. The IGBT units 41 receive low voltage control signals through connectors 43 from IGBT driver logic boards 39 that are connected to the main control panel 23. This signal opens and closes the IGBTs at very fast speeds dependent upon operator commands, braking power available, and SOC of the battery packs 26 and 28. High voltage DC power can be routed to charge the vehicle battery packs 26 and 28 when the battery SOC monitoring devices contained within the main control panel 23 indicate a charge cycle is required to maintain the desired SOC. This charge is supplied as a pulsed DC power supply via the IGBT switching units 41. The DC power controller 30 also functions to route additional DC power to supplement the AC generated power supplied by the gen-set 20. A control signal is generated in the main control panel 23 as part of the operator interface. The signal generated may interpret throttle and braking position as activated by the operator and sends this to the appropriate IGBT driver board 39 that in turn signals the IGBT switching units 41 to open or close dependent on the operator command. The same function occurs during dynamic braking. A signal interpreted within the main control panel 23 via the operator interface with the throttle and braking vehicle controls is sent to the appropriate IGBT driver board 39 that then activates the IGBT unit 41 to send power to the dynamic braking resistors 25. An alternative to sending power to the dynamic braking resistors 25 is to return power to the battery packs 26 and 28 for a charge cycle or to another useful device such as the hydrogen generator 13. The DC power controller 30 thus routes DC power dependent upon signals received from the main control panel 23 and provides feedback signals to main control panel 23.

Figure 9:
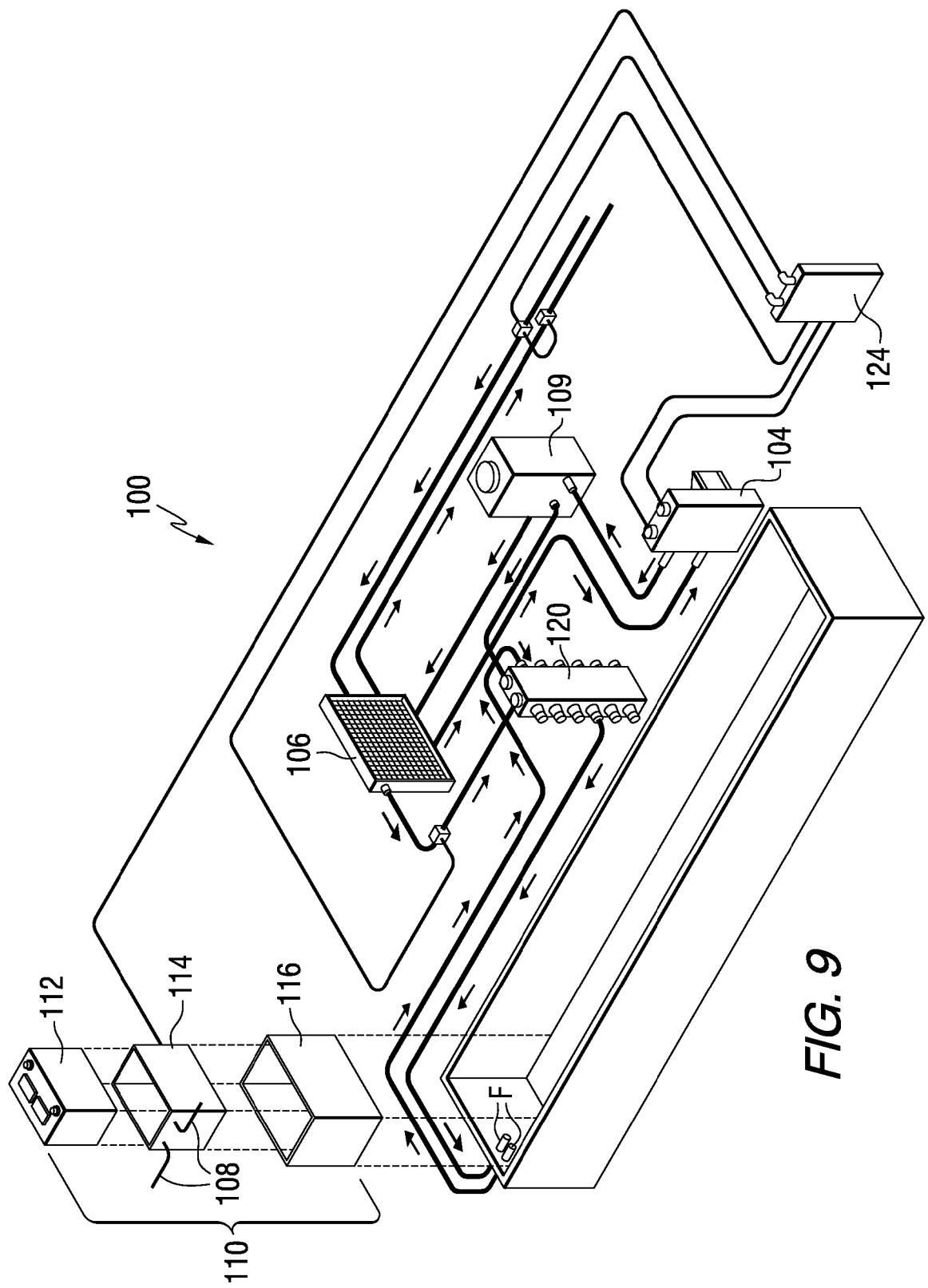
FIG. 9 illustrates a method of battery temperature control in accordance with an embodiment of the present invention.

FIG. 9 illustrates an alternative system 100 for maintaining the battery cells of the present invention at desired temperatures in accordance with an embodiment of the present invention. As noted above, to optimize the charge and discharge cycles of the batteries used in the assembly of the battery packs of the present invention, individual battery cell temperature is maintained within a specified range, e.g., within ±2° C. or ±1° C. of the optimal temperature for the particular type of battery used. In this embodiment, the use of an onboard temperature control system 100 allows the system to take advantage of a wide range of alternative electrical storage platforms as they are developed. These alternative storage systems may include new lead acid cell batteries such as modified electrode batteries, lead acid/capacitor hybrid batteries (bat-caps), alternative electrolyte battery technology and other advancements in lead acid technology. These alternate element battery technologies can be incorporated into the battery pack design for on board electrical storage. Some common battery alternatives include carbon-zinc, alkaline, lead acid, nickel metal hydride, nickel cadmium and lithium ion. Others include nickel/hydrogen cells, nickel/cadmium cells, nickel/metal hydride (NiMH) cells, sodium/sulfur cells, nickel/sodium cells, manganese-titanium (lithium) cells, rechargeable alkaline manganese cells, nickel zinc cells, iron nickel cells, iron air cells, iron silver cells, and redox (liquid electrode) cells. It is noted that the onboard temperature control system 100 also allows the system of the present invention to operate with any other electrical storage system that can be optimized by controlling the temperature within a specified range of operation. These include but are not limited to fuel cell technology, heat scavenging technology and alternate element battery technologies.

The temperature control system 100 is comprised of a circulation pump 104 of either high or low voltage, a heat exchanger 106, temperature probes 108 with feedback circuitry located within battery packs 110 at optimal locations, non-freezing heat transfer fluid F, supplied from a fluid reservoir 109, a manifold system 120 capable of directing the flow of the heat transfer fluid F, and a thermostatic control system 124 capable of operating external circuitry. In the battery packs 110, individual electrical storage unit fluid jackets 114 surround each battery 112, and insulation material 116 surrounds each jacket 114.

The thermostatic control device 124 is preferably remotely located within the cab of the vehicle so that a driver may monitor the operating temperature of the battery packs with either a digital or analog read out. The remote cab mounted thermostatic monitor senses cell temperature through thermo coupling devices 108 located within the individual electrical storage units 110. The thermostatic monitor contains variable relay interfaces that operate external solenoids placed within the main manifold system 120, which then directs the heat transfer fluid F to the fluid jackets 114 surrounding each individual electrical storage unit 112. The heat transfer fluid F is heated or cooled through the heat exchanger 106 dependent upon the optimal operating temperature range to be maintained by the system. The heat transfer fluid F is then returned to the main manifold system 120 where it is either allowed to dump heat to the heat exchanger or absorb heat from the heat exchanger, dependent upon the heat transfer fluid temperature.

The heat transfer liquid F may have a chemical base of methanol, ethylene glycol, propylene glycol, organic acid or other blends that transfer heat readily and prevent freezing of the transfer fluids. A preferred heat transfer fluid F comprises a ferrofluid. Ferrofluids provide superior heat and cold transfer properties in comparison with other heat transfer fluids commonly used in industrial and automotive applications today. Ferrofluids are colloidal mixtures composed of small, e.g., nanoscale, ferromagnetic or ferrimagnetic particles suspended in a carrier fluid, usually an organic solvent as noted above. A surfactant is often added to the ferrofluid to help maintain the dispersion of the particles within the carrier fluid. Ferrofluids may be composed of nanoscale particles (diameter usually 10 nanometers or less) of magnetite, hematite or other compounds containing iron. A diameter of 10 nanometers is small enough for thermal agitation to disperse the particles evenly within a carrier fluid which in turn allows the particles to contribute to the overall magnetic response of the fluid. In addition to their magnetic properties, the iron based nano particles suspended within the carrier fluid improve the ability of the carrier fluids to transfer and carry heat or cold within the carrier fluid.

Figure 10:
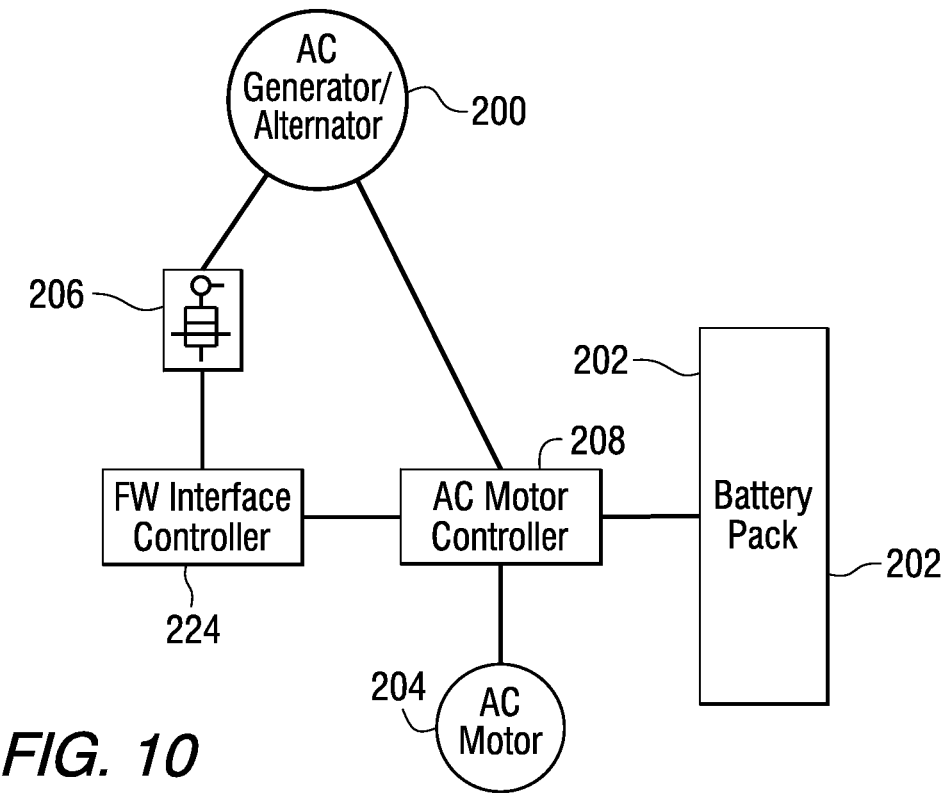
FIG. 10 illustrates an adjustable current limiting output of a generator in accordance with an embodiment of the present invention.
Figure 11:
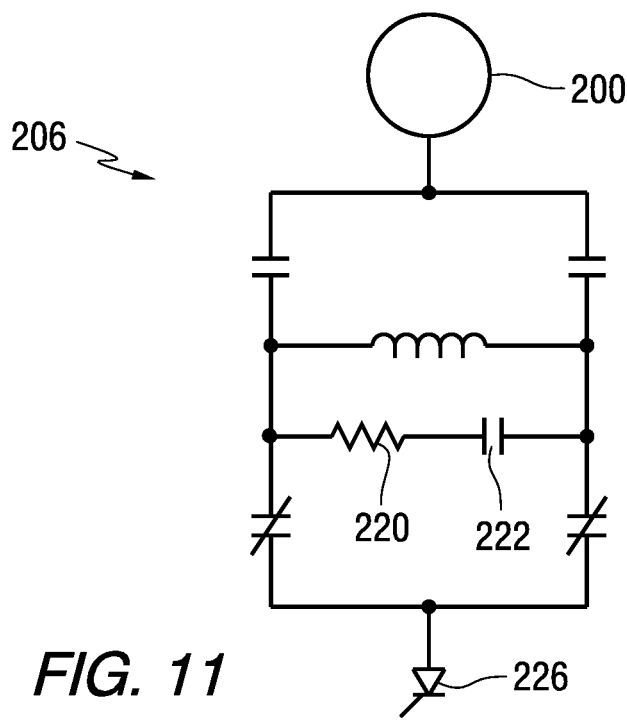
FIG. 11 illustrates an adjustable current limiting output of a generator in accordance with an embodiment of the present invention.

As illustrated in FIGS. 10 and 11, one embodiment of the invention provides an AC generator 200 which incorporates a battery pack 202 in parallel to satisfy the load demands of an AC electric drive motor 204. The battery pack 202 operates as a power boost device to supplement power derived from the AC generator 200. An AC motor controller 208 and a field weakening device interface controller 210 are also provided. The AC generator 200, battery pack 202, AC electric drive motor 204 and AC motor controller 208 may be similar to those described above. The design parameters are such that when the boost battery pack power is not required or reaches a low state of charge the battery pack 202 will disconnect from the load. The load sharing of the battery pack is designed to be intermittent not continuous. The battery pack 202 is used to supplement and add to the power output of the AC generator 200 during peak demands.

Limited battery boost power is made available to the AC electric drive motor 204 of the vehicle. During peak power demand of the electric motor 204, only a limited number of short duration discharge cycles from the battery pack 202 may be obtained. These are spikes lasting only one to two seconds with a shallow depth of discharge. The load is not shared with the battery pack 202 during peak load periods.

The AC generator reaction time to a load demand may be faster than a series wired battery pack. This is due to the internal resistance or impedance of the battery pack. The AC generator, being controlled only by a simple regulation device that reacts to load demand, attempts to satisfy the increased load requirement for acceleration and grade climbing of the vehicle. The faster reaction time and increase of power from the generator block the incoming voltage of the battery pack. A device that reduces the current to the field coil of the generator at a set point to stabilize the generator output and allow the battery pack to share the load with the generator would be desirable.

In accordance with an embodiment of the invention, by reducing the current to the field coil of an alternator or excitation field, e.g., a current limiting event, the output current of the AC generator 200 can be not only limited but also maintained at a defined value. This control of the AC generator 200 power output to a set value allows the boost battery pack 202 of the invention to provide a current to combine with and supplement current provided from the AC generator 200.

Typically, a conventional generator will continue to attempt to supply increasing levels of current, as called upon, leading to the overloading of a hydrocarbon fueled engine and to unwanted overheating of the generator itself. Generators may utilize a simple safety shut off device such as a circuit breaker to limit maximum current output when the generators are called upon to exceed their maximum rated capability.

In accordance with an embodiment of the invention, a field weakening device 206 constantly monitors the AC generator 200 output current through an external shunt, or Hall effect type current sensor. At preset points, the current limit output device 206, instead of using a circuit breaker for current control as in other applications, incorporates excitation field weakening circuitry which allows the system of the present invention to provide continuous power output from the AC generator 200 without overheating the generator. The hydrocarbon fueled engine also continues to operate within normal torque and temperature ranges without disrupting the power output of the AC generator 200.

When the boost battery pack 202 power is not required or reaches a low state of charge this will cause the battery pack 202 to disconnect. The current limit feature of the field weakening device 206 will then allow the AC generator 200 to continue to supply power normally.

In accordance with this embodiment, a field weakening or field shunting circuit as shown in detail in FIG. 11 is provided in order to weaken the current to the alternator field coil 200. The components consist of a high power resistor 220 with very low resistance, a single pole contactor or IGBT switching unit 222 and a blocking diode 226. The field weakening resistor 220 is placed in parallel with the alternator field coil of the AC generator 200. The AC generator typically operates at 60 Hz. While operating with a low power requirement, the field weakening contactor 222 remains open and the field weakening resistor 220 has no effect on the generator operation. The field weakening interface control 224, as shown in FIG. 10, monitors different system points and energizes the contactor 222 when battery power is required and generator 200 output is to be stabilized and limited. Once the field weakening system 206 is energized, the alternator field coil 200 current reduces to a preset adjustable value. For example, the current may be held at a level of between 75 and 95% of the maximum current level of the generator. This allows a small amount of alternator field coil current to bypass the alternator field coil 200 and flow through the field weakening resistor 220. The overall alternator current remains the same but now some of the alternator field current is dissipated by the field weakening resistor 220. This reduction in field current weakens the magnetic strength of the alternator field and allows a reduction of torque and current. The system operating in this mode allows battery current to enter the motor drive control component 208 of the vehicle while maintaining a stable preset generator output. This condition may be required during acceleration and grade climbing of the vehicle. During deceleration, grade decent, or level terrain, again at a preset and adjustable level, the field weakening interface control 224 drops out the field weakening contactor 222 and returns to a bypass mode. The field weakening interface control 224 may have two or more adjustments. One adjustment controls the field weakening contactor 222 pickup point and another controls the dropout point. Both settings are related to current, which determines when current in the alternator 200 is high enough to utilize field weakening or load demand is low enough to drop the field weakening out.

In a practical example of the operation of the field weakening device, a loaded vehicle may be traveling on flat and level terrain, under which conditions electrical power to the motor is provided exclusively by the generator. The vehicle now encounters a hill to climb and more power is required by the motor to maintain speed. The generator is called upon to provide additional power and without the field weakening device will attempt to provide more and more power until the ICE becomes overloaded or the generator safety circuitry engages to shut off the generator output. With the field weakening device in place, the generator attempts to fulfill the additional power requirement and will do so but only until the field weakening device engages at which point the generator maintains a safe, and steady maximum output at a current level of from about 75% to about 95% of the maximum current capability of the generator. Additional power required to maintain vehicle momentum is thus sourced from the battery packs, combined with the power from the generator and sent to the motor as required by the motor controller. When the vehicle returns to flat and level, or a down slope, battery power is disengaged and then the field weakening device also disengages to allow the generator to return to normal operation. The same scenario above may also occur should the driver require aggressive acceleration of the vehicle.

Figure 12:
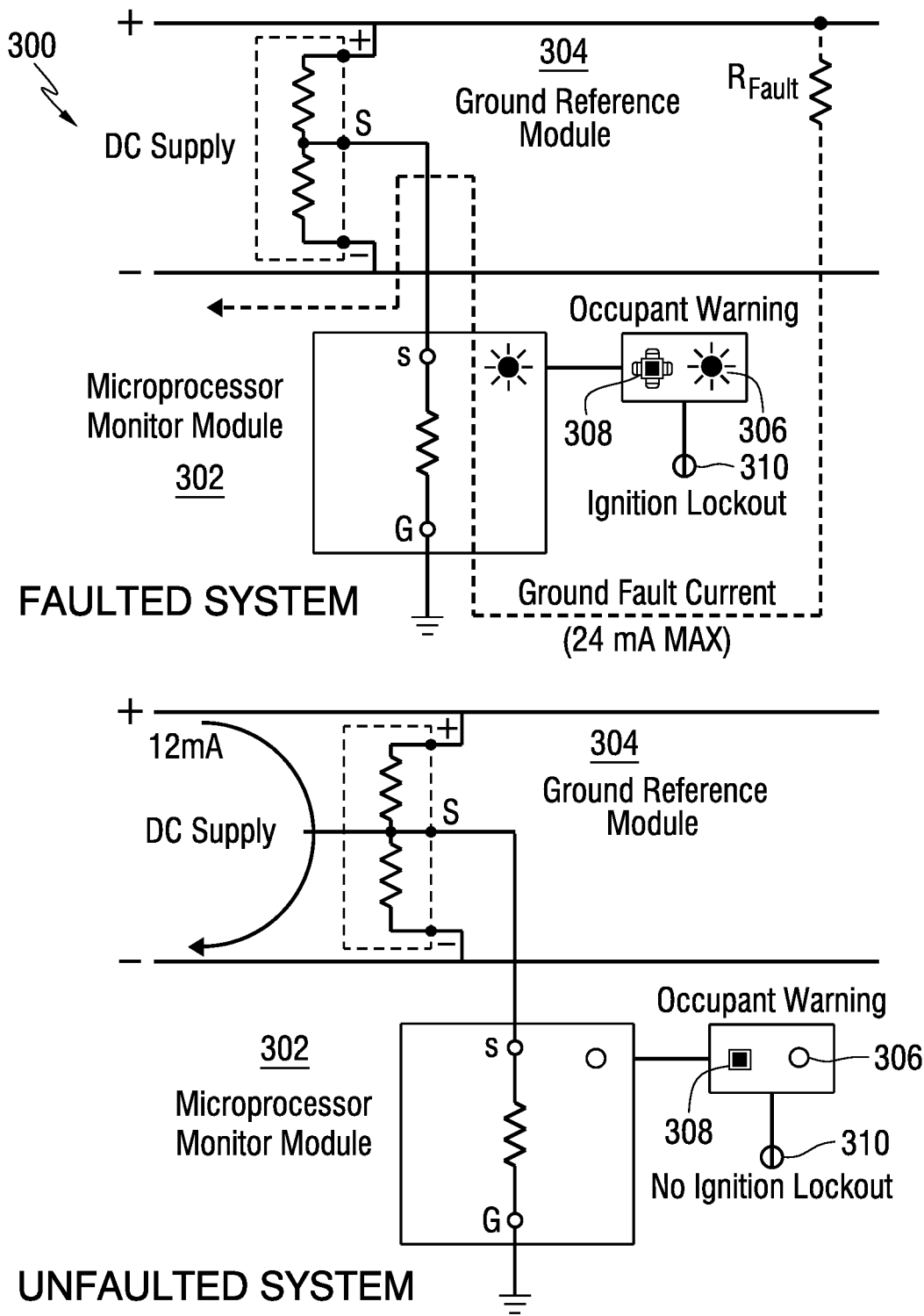
FIG. 12 illustrates a ground fault interrupter and voltage leakage device addition in accordance with an embodiment of the present invention.

FIG. 12 illustrates an embodiment of the present invention in which circuitry 300 is provided in order to protect vehicle occupants and bystanders from current leakage and ground fault conditions associated with the floating ground on board DC electrical storage devices. This circuitry 300 is capable of monitoring for fault conditions, warning occupants of any occurrence and, interrupting any voltage leakage above a preset value, and interrupting flow of electrical current under such ground fault conditions.

The circuitry 300 as described can operate in conjunction with the battery packs of the present invention, labeled DC supply, as well as any other DC floating ground electrical storage device such as, but not limited to, fuel cells, heat scavenging devices and other electrical storage devices. These alternate battery technologies include carbon-zinc, alkaline, lead acid, nickel metal hydride, nickel cadmium and lithium ion. Others include nickel/hydrogen cells, nickel/cadmium cells, nickel/metal hydride (NiMH) cells, sodium/sulfur cells, nickel/sodium cells, manganese-titanium (lithium) cells, rechargeable alkaline manganese cells, nickel zinc cells, iron nickel cells, iron air cells, iron silver cells, and redox (liquid electrode) cells.

Such batteries may require protection circuitry that can function in cross technology applications. The circuitry 300 consists of a microprocessor module 302 capable of monitoring a series connected DC electrical storage device using a floating ground configuration, a ground reference module 304 that interfaces with the microprocessor module 302, an in-cab warning light 306, audible alarm 308 and ignition key interlock 310, and the associated wiring required for interaction of the devices. The module 300 is activated upon start up of the electrical system using a standard ignition switch. The circuitry determines if there is a fault condition of either voltage leakage outside of a preset range determined to be above safe levels or if a ground fault condition exists in the DC power storage devices. When an unsafe condition exists the circuitry 300 prevents interlocking of the battery packs or other DC power storage devices, and alerts the operator by means of a buzzer and dash mounted warning light of the condition, as well as disabling the ignition start sequence. In an accident scenario, the circuitry may protect occupants of the vehicle and rescue workers by cutting off the DC power from the battery packs and cutting off the fuel pump circuit.

Under normal conditions as determined by the module 300, the start interlock of the DC power storage system continues unimpeded resulting in the normal starting sequence of the vehicle. The monitor continues its operation during the vehicles normal operation to ensure that the preset safe conditions are maintained and that no ground fault conditions exist.

If during the operation of the vehicle voltage leakage in excess of the set value appears or a ground fault condition is found, the vehicles DC power storage device is disconnected from the main drive circuit and the dash mounted warning light and buzzer are activated. Simultaneously, the ground fault interrupter is then activated and the system cannot be started without the fault condition being corrected.

Figure 13:
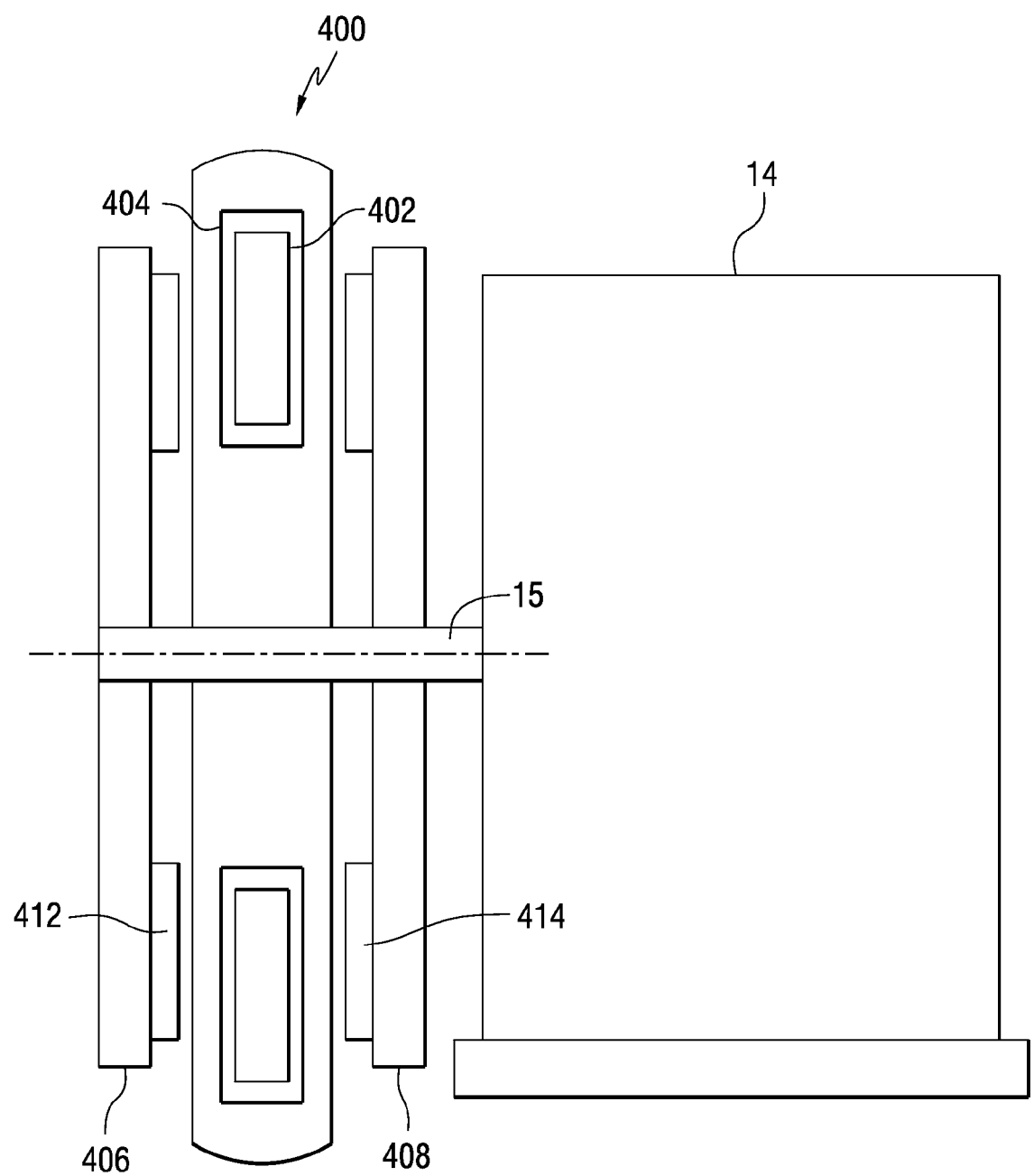
FIG. 13 illustrates a permanent magnet generator in accordance with an embodiment of the present invention.

In another embodiment of the invention the induction motor using an electromagnetic field current can be replaced with a permanent magnet (PM) motor using permanent magnets to produce a field current. The PM motor is a rotating electric machine with a 3-phase stator, like that of an induction motor. FIG. 13 illustrates a permanent magnet generator 400 in accordance with an embodiment of the present invention connected to the IC engine 14 by a drift shaft 15. The generator 400 has a stator core 402 and stator windings 404 mounted on the drive shaft 15. Rotating discs 406 and 408 mounted on the shaft 15 include permanent magnets 412 and 414. The rotor has surface-mounted permanent magnets of neodymium-boron-iron or samarium-cobalt or ferrite or other such elements. When the stator is powered by a 3-phase sinusoidal voltage, the PM motor is equivalent to an induction motor with the air gap magnetic field produced by a permanent magnet. The use of a permanent magnet to generate an air gap magnetic flux makes it possible to design highly efficient motors.

A PM motor provides several advantages when used in the inventions hybrid drive train. These advantages include high efficiency, high torque per volume, and low moment of inertia, smaller frame size and lighter weight. Since there is no need for current to be fed into the rotor, stray currents are not created thus eliminating arc pitting and bearing failures. The use of a PM motor may improve the safety of a hybrid vehicle design as it eliminates a common source of electrical leakage to the chassis of a vehicle. Electrical leakage in a hybrid vehicle can create a shock hazard to the vehicle occupants as well as to anyone coming in contact with the vehicle.

Using a PM motor as the drive motor in this embodiment of the invention requires special circuitry that can accurately determine the start position of the PM motor. A PM motor will typically jog, or rotate, to a known position to enable starting of the device. This could create an impact hazard to vehicle occupants or anything in close proximity to the vehicle. This starting requirement of a PM motor can be eliminated through the use of a shaft motor encoder operating in conjunction with a Hall sensor with feedback to the motor controller to determine the exact at rest position of the motor. This combination allows starting from any resting motor position, eliminating the jog, or rotate to start position, requirement.

In this embodiment, control of dynamic braking and regenerative power may be accomplished by an alternative method than that used with an induction type motor. Two methods may be used in the dynamic braking and regenerative power control. The first method consists of shorting out one phase of the three phase power supplied to the PM motor. Such circuitry may be encompassed within the PM/AC motor controller when used with a PM drive motor. The second method consists of pulse width modulation (PWM) clamping of one phase to the PM drive motor. These methods may be used alone or together to provide either dynamic braking or regenerative power to the battery pack during times of deceleration or stopping of the vehicle.

Another benefit to the use of a PM drive motor is the reduction in size and weight of the motor assembly. Reduction in size creates flexible motor placement within the system and increases the payload capacity of a heavy haul vehicle. An induction type motor of similar power and performance can weigh up to 10 times that of a PM motor. This increases the profitability of a commercial vehicle by allowing extra freight to be loaded while maintaining legal weights of operation.

Another embodiment of the invention includes the use of a permanent magnet (PM) generator attached to a hydrocarbon fueled internal combustion engine to provide the generated power supply of the vehicle. Permanent magnet electrical machines are a recent development and are becoming cost competitive with traditional induction electrical machines.

When used in the invention as described, a PM generator offers advantages over traditional alternators or electric generation machines (generators). The magnetic field of the PM generator, provided by permanent magnets, is developed with a rotor structure consisting of a ring of magnetic iron with magnets mounted on its surface. A magnetic material such as neodymium-boron-iron or samarium-cobalt or other such elements can provide a magnetic flux in this type of machine. Unlike electromagnetic generators, most commonly used for power generation, a permanent magnet generator is simpler, nearly maintenance free, and operates at higher efficiency over a wider range of power output. Since there is no need for current to be fed into the generator rotor, stray currents are not created and thus arc pitting and bearing failures are avoided.

The use of a PM generator may improve the safety of a hybrid vehicle design as it eliminates a common source of electrical leakage to the chassis of a vehicle. Electrical leakage in a hybrid vehicle can create a shock hazard to the vehicle occupants as well as to anyone coming in contact with the vehicle. The ability to provide variable speed power generation to the system, with the use of a PM generator allows for more efficient operation of the hydrocarbon fueled internal combustion engine over a wider range of road and traffic conditions.

To provide a given current, the horsepower requirement of the internal combustion engine is less when the excitation field of an electric generation machine is provided by permanent magnets, than when the excitation field is developed electromagnetically. This in turn allows for a more efficient operation of the hydrocarbon fueled internal combustion engine. Similarly, a PM generator requires less torque when starting, which also lowers the horsepower requirement for the IC engine of the system. The IC engine size may be reduced and the electrical output may be maintained, or the IC engine size may be maintained and the electrical output may be increased, which, in turn, allows downsizing of the ratings of the battery boost power circuitry and components.

Another gain in efficiency related to heavy haul vehicles is the weight saving in the overall drive train when a PM generator is used. For example, a typical electromagnetic power generation machine used in the invention may weigh about 835 lbs for an electrical output of 125 KW and requires a hydrocarbon fueled IC engine of about 197 horsepower. A permanent magnet generator may produce an electrical output of 200 kW with the same hydrocarbon fueled 197 horsepower IC engine and weighs only about 255 lbs. Such a 580 lb weight savings in a commercial vehicle would allow an operator of the vehicle to carry this weight in additional cargo thereby increasing the profit potential of each trip.

The use of a PM generator in the hybrid design does not necessitate the incorporation of additional starting control features to overcome the required starting positioning of a typical PM machine. A PM machine typically will rotate to a set starting position in relation to a set rotor position in order to start properly. This characteristic of a PM machine is controlled simply in the system of the present invention by the independent operation of the electric machine from the vehicles drive system.

The following examples illustrate various aspects of the present invention, and are not intended to limit the scope of the invention.

Example 1

A 1989 Mack truck T was converted from a conventional diesel engine type truck to a hydrocarbon fueled electric series hybrid propulsion system 8 of the present invention. Step 1 is the removal of unnecessary components in the 1989 Mack truck T. In Step 2, the radiator, engine, transmission, fuel tanks and drive shaft of the 1989 Mack truck are removed for the conversion process. Step 3 is the installation of the AC electric motor 32 and drive shaft 33. An example of an AC electric motor 32 is available under the designation L1431A Inverter Duty manufactured by Reliance Elect. Step 4 is the alignment of the drive train with the rear differential 34. In Step 5, a gen-set GS is readied for installation. Step 6 is the installation of the diesel engine 14 and AC generator 20. An example of a hydrocarbon fueled IC engine 14 is available under Model No. 4045T manufactured by John Deere. An example of an AC generator 20 is available under Model No. 363PSL3127 manufactured by Marathon Electric. In Step 7, the diesel fuel tanks 16 and 18 and battery packs 26 and 28 are tested for a proper fit. Step 8 is the installation of diesel fuel tanks 16 and 18 and battery packs 26 and 28. An example of a battery comprising thin wall plates suitable for use in the battery packs 26 and 28 is available under Model No. 24 MS-6 manufactured by Ever Start. Step 9 is the installation of the high voltage control (HVC) components and the AC/DC motor controller 22. An example of an AC/DC controller 22 is available under Model No. GV3000/SE manufactured by Reliance Elect. In Step 10, the AC generator 20 and electric drive motor 32 connections are made and tested. In Step 11, the control wiring is integrated to the original truck wiring. Step 12 is the installation of the circuits of the AC/DC controller 22. In Step 13, the battery packs 26 and 28 are wired and installed. Step 14 results in a completed battery pack 26, 28. Step 15 is the installation of the ventilation and electrolyte circulating cooling system for the battery packs 26 and 28. Step 16 is the installation of the electrolyte circulating cooling manifold and pump for battery packs 26 and 28. An example of an electrolyte circulation system 48 is a modified watering system produced by Toyota Fork Lift Division available under Model No. 6v2210. Steps 17 and 18 are the electrification of a power steering unit and the air brake system 50, respectively. In Step 19, the truck T is prepped for painting. Step 20 is the truck T in its completed stage.

Table 1 below summarizes test results from the above-described vehicle. As can be seen, a fuel efficiency of over 15 mpg was achieved for the vehicle, versus a fuel efficiency of about 5.5 mpg before the vehicle was retrofitted.

TABLE 1

Test Trip Log

| | |
|---|---|
| Vehicle GVW | 16,100 lbs |
| Distance Traveled | 26.73 miles |
| Time Duration | 47 min |
| Stop Time at Idle | 11 min |
| Moving Time | 36 min |
| Min Elevation | 763 ft |
| Max Elevation | 992 ft |
| Max Speed | 59 mph |
| Min Speed | 0 mph |
| Ave Speed | 45.4 mph |
| Fuel Consumed | 1.75 gallons |
| Mileage | 15.27 mpg |
| Starting Battery Voltage | 353 V |
| Stopping Battery Voltage | 349 V |
| Min Battery Temp | 84° F. (29° C.) |
| Max Battery Temp | 88° F. (31° C.) |

The present invention provides many advantages over the prior art. Fuel efficiency is increased significantly over conventional diesel powered vehicles, e.g., mileage may be greater than 10 mpg or 15 mpg, with fuel efficiency being at least 100 or 150 percent greater than the efficiency of the same vehicle equipped with a standard diesel engine.

Another advantage of using the DC battery packs 26 and 28 in the system 8 of the invention is the reduction of lead pollutants that are generally released into the environment with the type of battery packs used in present day diesel electric series hybrid propulsion systems. The present invention uses battery packs that have thin lead plates in the individual cells instead of the normally used thick lead plates in a deep discharge cell. As electric vehicles become more prevalent in the transportation industry, most designs are based on battery packs with deep discharge capabilities in order to enhance power and driving distances. This is accomplished by using the thicker lead plates built into the individual cells of the battery packs or by using metal plates made of new exotic materials replacing the lead plates, as discussed above. The present invention uses battery packs that have thin lead plates in the individual cells which are designed to accomplish fast discharge and charge rates.

Even though lead from batteries in the United States approaches an 80 percent recycling rate, an increased use of these batteries for providing power in electric vehicle propulsion systems will compound the problem of recycling the lead content of the batteries as these types of drive trains become more acceptable in the market place. The present invention makes use of thin lead plates within the individual cells rather than the thick lead plates commonly used in deep discharge traction batteries, thus reducing the amount of lead content which needs to be recycled as electric drive trains become more prevalent.

The invention also has the added benefit of reducing $NO_x$ emissions associated with class 8 DOT vehicles. Beginning in the year 2010, U.S. federal and state air control agencies are enacting stringent $NO_x$ emissions controls on all class 8 vehicles operating with diesel powered drive trains. Most class 8 semi-truck manufacturers worldwide have developed technology using exhaust system catalytic converters for complying with the 2010 EPA requirements for reducing $NO_x$ emissions. Other manufacturers are using chemical solutions, such as urea, to meet the upcoming EPA requirements for reducing $NO_x$ emissions. These recent developments, even though they reduce the amount of $NO_x$ emissions released during normal operation of a class 8 DOT vehicle, are expensive and add to the complexity and weight of the overall drive system. A means of reducing $NO_x$ emissions of a hydrocarbon fueled powered IC engine is through the manipulation of the fuel timing settings. While this method may be effective in reducing $NO_x$ emissions, it has a detrimental effect on the performance of an IC engine, particularly when required to be operated at varying power curves and rpm ranges.

In addition to reduced $NO_x$ emissions, systems of the present invention also significantly reduce $CO_2$ emissions by virtue of the fact that less hydrocarbon fuel is burned during operation of the vehicles. It has been found that the systems typically reduce $CO_2$ emissions by at least 50 percent, and may reduce such emissions by at least 65 percent in some cases.

The drive train system of the invention is more reliable than present day IC drive systems in that many moving mechanical parts and devices are replaced with electron flow control, i.e., electrical devices that are not subject to mechanical wear and tear. The invention, as described, has fewer main components compared to present day propulsion systems, and these components of system 8 of the invention, may have a life span of about 500,000 hours in industrial applications.

Whereas particular embodiments of this invention have been described above for purposes of illustration, it will be evident to those skilled in the art that numerous variations of the details of the present invention may be made without departing from the invention as defined in the appended claims.

The invention claimed is:

1. A hybrid propulsion system for powering a vehicle comprising:
    a hydrocarbon fueled engine;
    an AC generator powered by the hydrocarbon fueled engine;
    at least one DC battery;
    an AC/DC controller; and an AC electric motor drivingly connected to a power train of the vehicle, wherein the AC generator and the at least one DC battery provide input to the AC/DC controller, the AC/DC controller converts DC input from the at least one DC battery to AC and outputs AC to the AC electric motor to provide boost power to the power train of the vehicle, and the AC generator continuously powers the AC electric motor.

2. The hybrid propulsion system of claim 1, further comprising a DC pulsed charge computer controller connected to the AC/DC motor controller and to the at least one DC battery.

3. The hybrid propulsion system of claim 1, further comprising means for controlling the temperature of the at least one DC battery.

4. The hybrid propulsion system of claim 3, wherein the temperature of the at least one DC battery is maintained within a temperature of from 20 to 35° C.

5. The hybrid propulsion system of claim 3, wherein the temperature of the at least one DC battery is maintained within a range of ±2° C. of an optimal battery temperature.

6. The hybrid propulsion system of claim 1, further comprising an electrolyte pumping system connected to the at least one DC battery for heating and cooling an electrolyte of the at least one DC battery to maintain an optimum temperature range of the electrolyte of the at least one DC battery.

7. The hybrid propulsion system of claim 1, wherein the at least one DC battery comprises thin plate flooded lead acid cells.

8. The hybrid propulsion system of claim 1, further comprising a field weakening circuit connected to the AC generator.

9. The hybrid propulsion system of claim 1, wherein the vehicle is a semi-tractor truck capable of operating under normal load conditions and at highway speeds.

10. A vehicle powered by the hybrid propulsion system of claim claim 1.

11. A semi-tractor truck vehicle having a hybrid propulsion system comprising:

a hydrocarbon fueled engine;
an AC generator powered by the hydrocarbon fueled engine;
at least one DC battery;
an AC/DC controller connected to the AC generator and the at least one DC battery; and
an AC electric motor connected to the AC/DC controller and in driving engagement with a power train of the vehicle,
wherein the at least one DC battery provides boost power to the power train of the vehicle, the AC generator continuously powers the AC electric motor, and the semi-tractor truck vehicle is capable of running at a speed of at least 50 mph for at least 5 hours.

12. The semi-tractor truck vehicle of claim 11, wherein the vehicle is capable of running at a speed of at least 55 mph for at least 8 hours.

13. The semi-tractor truck vehicle of claim 11, wherein the vehicle has a fuel efficiency of greater than 10 mpg.

14. The semi-tractor truck vehicle of claim 11, wherein the vehicle has a fuel efficiency of greater than 15 mpg.

15. The semi-tractor truck vehicle of claim 11, wherein the vehicle has a fuel efficiency at least 100 percent greater than a fuel efficiency of the vehicle equipped with a standard diesel engine.

16. The semi-tractor truck vehicle of claim 11, wherein the AC/DC controller converts DC input from the at least one DC battery to AC, and outputs AC to the AC electric motor to drive the power train of the vehicle.

17. The semi-tractor truck vehicle of claim 11, further comprising means for controlling the temperature of the at least one DC battery.

18. The semi-tractor truck vehicle of claim 17, wherein the temperature of the at least one DC battery is maintained within a temperature of from 20 to 35° C.

19. The semi-tractor truck vehicle of claim 17, wherein the temperature of the at least one DC battery is maintained within a range of ±2° C. of an optimal battery temperature.

* * * * *